(12) United States Patent
Watanabe et al.

(10) Patent No.: US 8,228,690 B2
(45) Date of Patent: Jul. 24, 2012

(54) DC-DC CONVERTER AND POWER SUPPLYING SYSTEM INCLUDING SAME

(75) Inventors: Yasuto Watanabe, Saitama (JP); Mitsuaki Hirakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 12/851,144

(22) Filed: Aug. 5, 2010

(65) Prior Publication Data

US 2011/0032733 A1 Feb. 10, 2011

(30) Foreign Application Priority Data

Aug. 5, 2009 (JP) ................. 2009-182142

(51) Int. Cl.
*H02M 3/335* (2006.01)
*H02M 1/10* (2006.01)
(52) U.S. Cl. ............ 363/16; 363/142; 323/259; 307/43; 307/72
(58) Field of Classification Search .......... 323/259, 323/340; 363/15, 16, 17, 142; 307/43, 72, 307/74, 75, 80

See application file for complete search history.

(56) References Cited

U.S. PATENT DOCUMENTS

| 4,866,586 A * | 9/1989 | Suko ................. 363/15 |
| 7,167,383 B2 * | 1/2007 | Iwakura et al. ............. 363/89 |
| 7,839,018 B2 * | 11/2010 | Chen et al. ............. 307/46 |
| 8,116,103 B2 * | 2/2012 | Zacharias et al. ............. 363/17 |

FOREIGN PATENT DOCUMENTS

| JP | 2003-134691 | 5/2003 |
| JP | 3709789 B2 | 10/2005 |
| JP | 3744456 B2 | 2/2006 |

* cited by examiner

*Primary Examiner* — Gary L Laxton
(74) *Attorney, Agent, or Firm* — Nelson Mullins Riley & Scarborough LLP; Anthony A. Laurentano

(57) ABSTRACT

A DC-DC converter has a first-voltage-side port, a second-voltage-side port, and a third-voltage-side port, and performs, at different timings, an operation of boosting a first voltage to a third voltage and an operation of bucking a second voltage to the third voltage. A power supplying system includes a fuel cell, a secondary battery, an accessory system, the DC-DC converter, and another DC-DC converter connected between the fuel cell and a motor, and boosting the first voltage of the fuel cell to a fourth voltage to supply power to the motor through an inverter. The former DC-DC converter has the first-voltage-side port connected to the fuel cell, has the second-voltage-side port connected to the secondary battery, and has the third-voltage-side port connected to the accessory system.

21 Claims, 16 Drawing Sheets

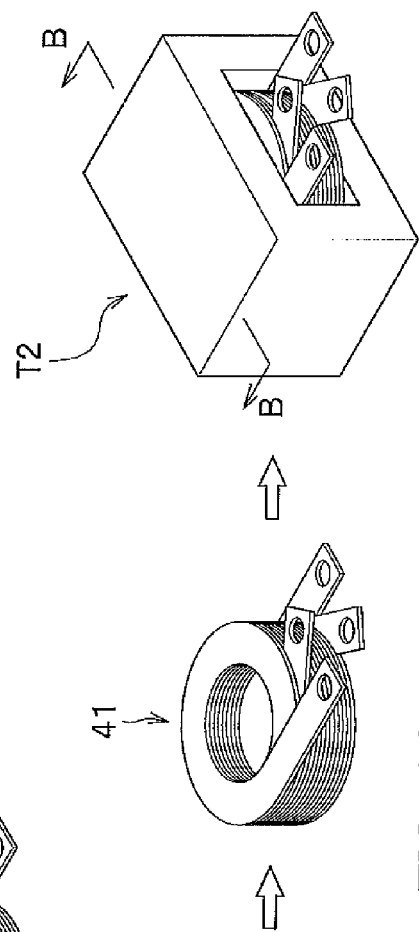
FIG. 14A
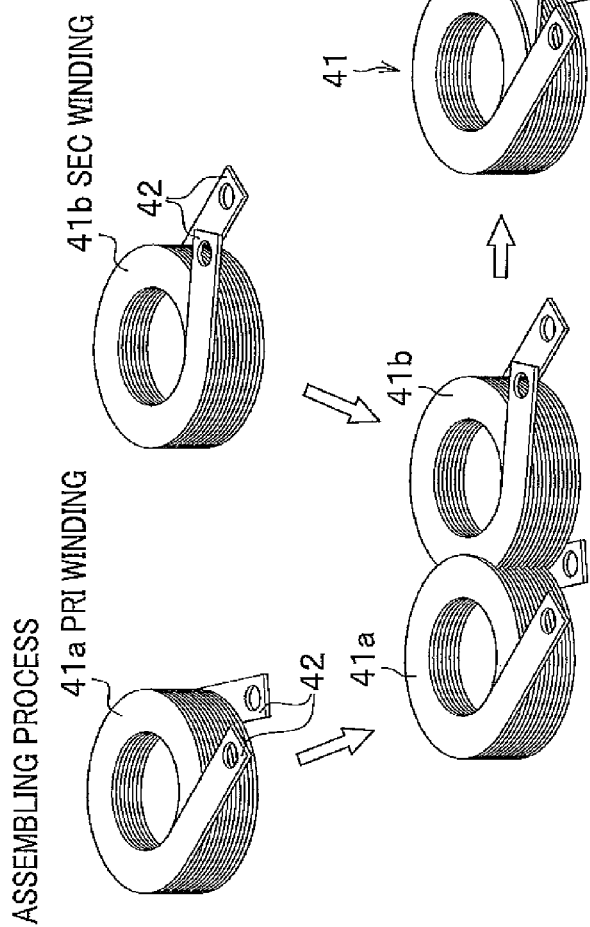
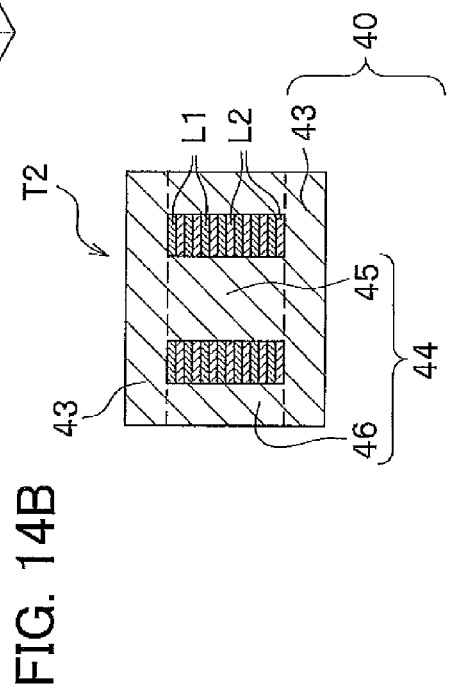
FIG. 14B

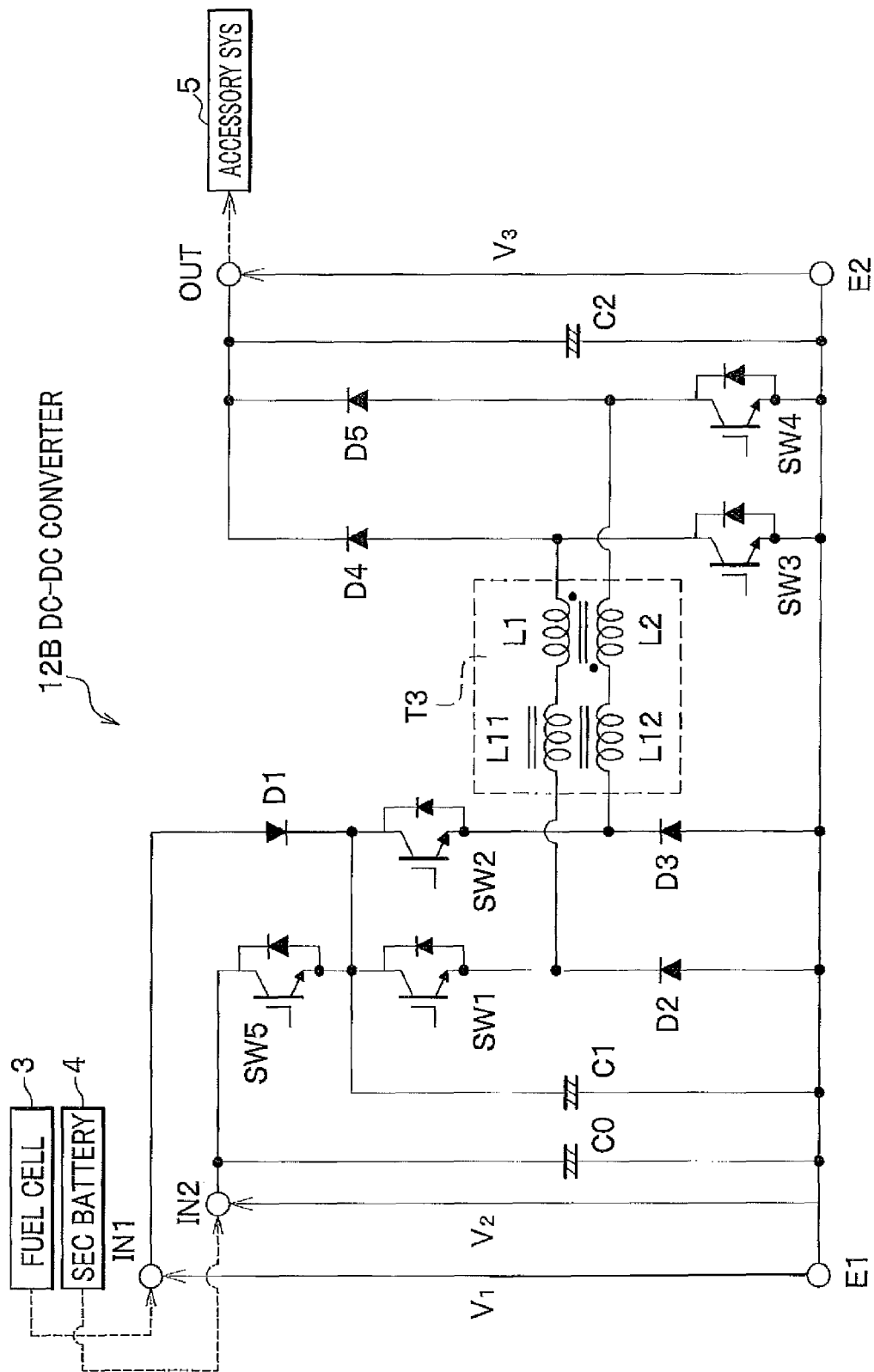

DC-DC CONVERTER AND POWER SUPPLYING SYSTEM INCLUDING SAME

CROSS REFERENCE TO RELATED APPLICATIONS

This application claims the foreign priority benefit under Title 35, United States Code, §119(a)-(d) of Japanese Patent Application No. 2009-182142, filed on Aug. 5, 2009 in the Japan Patent Office, the disclosure of which is herein incorporated by reference in its entirety.

BACKGROUND OF THE INVENTION

1. Field of the Invention

The present invention relate to a two-input/one-output DC-DC converter and a power supplying system which is equipped with the same and which supplies power to a load from two DC power sources, and more particularly, a power supplying system for parallel feeding to a load from a fuel cell and from a secondary battery.

2. Description of the Related Art

Conventionally, a power source system for parallel feeding to a load is known which uses an independent power source, such as a solar cell or a fuel cell, and a secondary battery (see, for example, JP 2003-134691A). According to this power source system, three boost converters are provided between the fuel cell and the secondary battery, power is supplied to the load from the fuel cell through a first boost converter, and excess power of the fuel cell is stored in the secondary battery through the second boost converter. Moreover, power is supplied to the load from the secondary battery through the third boost converter to make up the shortage of supplied power from the fuel cell.

Regarding fuel cell electric vehicles, there is known a power supplying system which adjusts a voltage through a DC-DC converter capable of both boosting and bucking and which connects a low-voltage system of 12 V including vehicle accessories and a low-voltage battery, and, a high-voltage system of 350 V including fuel-cell accessories and a load together (see, for example, Japan Patent No. 3744456). According to this power supplying system, a connection is established in such a way that an output voltage by the fuel cell is directly applied to the load.

In the technical field of fuel cells, there is a technological challenge for reducing the number of cells in a stack of a fuel cell from the standpoint of cost reduction and of a spatial restriction. When the number of cells in the stack is reduced, the output voltage by the fuel cell is decreased, so that if, like Japan Patent No. 3744456, an output voltage by a fuel cell is directly applied to a load, the load cannot acquire necessary motor output power. Conventionally, there is also known a system which further has a heavy-electricity booster at the output side of a fuel cell in addition to the configuration of the power supplying system disclosed in Japan Patent No. 3744456, and which supplies power to a load through the high power booster (see, for example, Japan Patent No. 3709789). This system also has a secondary battery capable of being charged by the high power booster, and the secondary battery can supply power to the fuel-cell accessories and to the load.

According to the systems disclosed in JP2003-134691A and in Japan Patent No. 3744456, however, when a fluctuation range of a voltage of a fuel cell is large or when a battery voltage reduction occurs, it is difficult to stably supply power to individual system elements. Moreover, according to the system disclosed in Japan Patent No. 3709789, when the voltage of the fuel cell or the voltage of a battery (the secondary battery or the low-voltage battery) fluctuates, it becomes difficult to supply power to the fuel cell accessories and to the load at a stable voltage.

SUMMARY OF THE INVENTION

An aspect of the present invention provides a DC-DC converter and a power supplying system that supply power to a load from two DC power sources stably.

A first aspect of the present invention provides a DC-DC converter comprising:

a first-voltage-side port and a second-voltage-side port both of which are input ports, respectively;

a third-voltage-side port which is an output port;

a reference-voltage terminal common for inputting and outputting;

first to fourth switching devices;

a transformer including a core and a primary winding and a secondary winding both wound around the core:

a backflow prevention diode having an anode connected to the first-voltage-side port; and a backflow prevention switching device having one end connected to the second-voltage-side port;

the first switching device having one end connected to another end of the backflow prevention switching device, wherein the second switching device has one end connected to a cathode of the backflow prevention diode;

the primary winding has one end connected to another end of the first switching device;

the secondary winding has one end connected to another end of the second switching device;

a first diode has a cathode connected to another end of the first switching device and has an anode connected to the reference-voltage terminal;

a second diode has a cathode connected to another end of the second switching device and having an anode connected to the reference-voltage terminal;

a third diode has an anode connected to another end of the primary winding and having a cathode connected to the third-voltage-side port;

a fourth diode has an anode connected to another end of the secondary winding and having a cathode connected to the third-voltage-side port;

the third switching device has one end connected to another end of the primary winding and having another end connected to the reference-voltage terminal; and the fourth switching device has one end connected to another end of the secondary winding and has another end connected to the reference-voltage terminal.

According to such a structure, the DC-DC converter has the first and second switching devices on a side of the input port as a first switching unit and the third and fourth switching devices on a side of the output port as a second switching unit while the transformer is sandwiched there between. Therefore, as the ON-OFF operation of the first and second switching devices and the ON-OFF operation of the third and fourth switching devices are performed at different timings, an operation of bucking a voltage at the second-voltage-side port to supply the bucked voltage to the third-voltage-side port and an operation of boosting a voltage at the first-voltage-side port to supply a boosted voltage to the third-voltage-side port can be performed independently from each other. Therefore, it is possible to change over an operation of boosting one power-supply voltage and an operation of bucking another power-supply voltage both supplied from two DC power sources connected to the first-voltage-side port and the second-voltage-side port, respectively.

A second aspect of the present invention provides a DC-DC converter based on the first aspect, further comprising a controller configured to supply an ON-OFF control signal to the backflow prevention switching device to provide switching between flowing of a current from the second-voltage-side port to the third-voltage-side port and a cutoff of the current by controlling an ON-OFF operation of the backflow prevention switching device According to such a structure, the DC-DC converter allows a current to flow from the second-voltage-side port to the third-voltage-side port as the backflow prevention switching device is turned on, and cuts off the current as the backflow prevention switching device is turned off. Because the DC-DC converter has the backflow prevention diode, the current flowing when the backflow prevention switching device is turned on does not flow back to the first-voltage-side port.

A third aspect of the present invention provides a DC-DC converter based on the first aspect, further comprising a controller configured to supply an OFF control signal to the backflow prevention switching device, turn the first and second switching devices on while the backflow prevention switching device is in an OFF state, and alternately control respective ON-OFF operations of the third and fourth switching devices to perform a boosting operation from the first-voltage-side port to the third-voltage-side port.

According to such a structure, the DC-DC converter boosts a first voltage by induced electromotive force generated as an excitation current flows through the primary winding of the transformer when the third switching device is in an on state and when the fourth switching device is in an off state, and outputs a boosted voltage to the third-voltage-side port. Moreover, the DC-DC converter boosts the first voltage by induced electromotive force generated as an excitation current flows through the secondary winding of the transformer when the third switching device is in an off state and when the fourth switching device is an on state, and outputs a boosted voltage to the third-voltage-side port.

A fourth aspect of the present invention provides a DC-DC converter based on the first aspect, further comprising a controller configured to supply an ON control signal to the backflow prevention switching device from a controller, turn the third and fourth switching devices off while the backflow prevention switching device is in an ON state, and alternately control respective ON-OFF operations of the first and second switching devices to perform a bucking operation from the second-voltage-side port to the third-voltage-side port.

According to such a structure, the DC-DC converter bucks a second voltage by induced electromotive force generated as an excitation current flows through the primary winding of the transformer when the first switching device is in an on state and when the second switching device is in an off state, and outputs a bucked voltage to the third-voltage-side port. Moreover, the DC-DC converter bucks the second voltage by induced electromotive force generated as an excitation current flows through the secondary winding of the transformer when the first switching device is in an off state and when the second switching device is in an on state, and outputs a bucked voltage to the third-voltage-side port.

A fifth aspect of the present invention provides a DC-DC converter based on the first aspect, wherein
the transformer comprises a magnetic field canceling transformer,
the primary winding and the secondary winding are magnetically coupled together via the core, and connected to the first and second switching devices to have an opposite induced current direction at a substantially same turn ratio,
the core includes:
a magnetic leg part around which the primary winding and the secondary winding are wound, and forms a closed magnetic path by magnetic flux generated by the primary and secondary windings; and
a basal part which fixes the magnetic leg part and which forms the closed magnetic path together with the magnetic leg part,
the magnetic leg part includes:
a middle leg part around which the primary winding and the secondary winding are wound; and
an external leg part formed side by side with the middle leg part.

According to such a structure, as the magnetic field canceling transformer is used in the DC-DC converter, such magnetic part can be miniaturized and light-weighted.

A sixth aspect of the present invention provides a DC-DC converter based on the fifth aspect, further comprising:
a first inductor provided between the first switching device and the primary winding; and
a second inductor provided between the second switching device and the secondary winding.

According to such a structure, the DC-DC converter can accumulate magnetic energy in the first and second inductors, so that the DC-DC converter can allow a current to flow through the primary winding or the secondary winding even if the switch is in an off state, thereby enabling adjustment of the boosting ratio or the bucking ratio.

A seventh aspect of the present invention provides a DC-DC converter based on the first aspect, wherein
the transformer is a magnetic field canceling transformer,
the primary winding and the secondary winding are magnetically coupled together via the core, and connected to the first and second switching devices to have an opposite induced current direction at a substantially same turn ratio,
the core includes:
a magnetic leg part where the primary winding and the secondary winding are wound so as to be stacked together, the magnetic leg part forming a closed magnetic path by magnetic flux generated by the primary and secondary windings; and
a basal part which fixes the magnetic leg part and which forms the closed magnetic path together with the magnetic leg part,
the magnetic leg part includes:
a middle leg part around which the primary winding and the secondary winding are wound; and
an external leg part formed side by side with the middle leg part.

According to such a structure, as the magnetic field canceling transformer having the primary winding and the secondary winding wound around the core so as to be alternately stacked together is used in the DC-DC converter, such a magnetic part can be miniaturized and light-weighted.

An eighth aspect of the present invention provides a DC-DC converter based on the first aspect, wherein
the transformer is a magnetic field canceling composite transformer including an inductor and a transformer,
the primary winding and the secondary winding are magnetically coupled together via a transformer core, and connected to the first and second switching devices to have an opposite induced current direction at a substantially same turn ratio, the transformer core includes:
a magnetic leg part around which the primary winding and the secondary winding are wound, and which forms a closed magnetic path by magnetic flux generated by the primary and secondary windings; and
a basal part which fixes the magnetic leg part and which forms the closed magnetic path together with the magnetic leg part,
the magnetic leg part includes:
a middle leg part around which the primary winding and the secondary winding are wound; and
an external leg part formed side by side with the middle leg part.
the primary winding extends outwardly of the transformer core, and an extending part of the primary winding is wound around an inductor first core, and
the secondary winding extends outwardly of the transformer core, and an extending part of the secondary winding is wound around an inductor second core.

According to such a structure, as the magnetic field canceling transformer is used in the DC-DC converter, the two inductors and one transformer all in one transformer can shear the primary winding and the secondary winding, such a magnetic part can be miniaturized and light-weighted.

A ninth aspect of the present invention provides a DC-DC converter based on the first aspect, wherein the backflow prevention switching device comprises an Insulated Gate Bipolar Transistor with a flywheel diode.

According to such a structure, the DC-DC converter can have the backflow prevention switching device having large-current and high-voltage characteristics.

A tenth aspect of the present invention provides a DC-DC converter based on the first aspect, wherein the first to fourth switching devices each comprise an Insulated Gate Bipolar Transistor with a flywheel diode.

According to such a structure, the DC-DC converter can have the first to fourth switching devices having large-current and high-voltage characteristics.

An eleventh aspect of the present invention provides a DC-DC converter based on the first aspect, wherein the backflow prevention switching device comprises a Metal Oxide Semiconductor Field Effect Transistor.

According to such a structure, the DC-DC converter can have the backflow prevention switching device having fast-speed and high-frequency characteristics.

A twelfth aspect of the present invention provides a DC-DC converter based on the first aspect, wherein the first to fourth switching devices each comprises a Metal Oxide Semiconductor Field Effect Transistor.

According to such a structure, the DC-DC converter can have the first to fourth switching devices having fast-speed and high-frequency characteristics.

A thirteenth aspect of the present invention provides a power supplying system comprising: the DC-DC converter based on the first aspect, further comprising:
first and second feeding paths;
a first DC power source comprising a fuel cell configured to output a first voltage;
a second DC power source comprising a secondary battery configured to output a second voltage;
an accessory system which is connected to the second feeding path supplying power from the fuel cell and from the secondary battery in a parallel, and which includes at least a fuel-cell accessory operated by a third voltage;
a first power converter which is connected between the fuel cell and the first feeding path to a load, and which boosts the first voltage of the fuel cell equal to one times or greater to convert the first voltage into a fourth voltage, the first feeding path supplying to the load the fourth voltage from the first power converter and the second voltage outputted by the secondary battery in parallel, wherein
the first-voltage-side port is connected to the fuel cell;
the second-voltage-side port is connected to the secondary battery;
the third-voltage-side port is connected to the second feeding path for the accessory system, and
the power supplying system performs, at different timings, an operation of boosting the first voltage of the fuel cell equal to one times or greater to convert the first voltage into a voltage equal to the third voltage, and an operation of bucking the second voltage of the secondary battery equal to one times or smaller to convert the second voltage into a voltage equal to the third voltage.

According to such a structure, the power supplying system supplies power to the load and the accessory system from the fuel cell and from the secondary battery through the first and second feeding paths, so that even if the voltage of the power source varies, it is possible to stably operate the power supplying system. Moreover, because the power supplying system supplies power boosted by the first power converter to the load, it is possible to reduce the number of cells in a stack of the fuel cell. Furthermore, because the power supplying system supplies power boosted by the second power converter to the accessory system, general-purpose and inexpensive accessories can be used by setting a voltage supplied to the accessory system to be a desired value.

Still further, because the power supplying system supplies power bucked by the second power converter to the accessory system, the fuel-cell accessory can be provided with power not through the first power converter from the secondary battery at the time of activation of the fuel cell. It is appropriate if the first power converter has only a function of boosting, so that the first power converter can be configured by using a small and inexpensive booster alone. When the secondary battery is fully charged, the power supplying system causes the second power converter to buck a regenerative voltage by the load and supplies a bucked voltage to the accessory system.

A fourteenth aspect of the present invention provides a DC-DC converter based on the thirteenth aspect, wherein a maximum value of the first voltage by the fuel cell is smaller than a minimum value of the second voltage by the secondary battery.

According to such a structure, as the first voltage is set to be within a desired range, the power supplying system can make a fourth voltage boosted by the first power converter smaller than the second voltage by the secondary battery, so that the power supplying system can operate in a mode in which power is supplied to the load with a priority being given to the secondary battery rather than the fuel cell.

A fifteenth aspect of the present invention provides a DC-DC converter based on the thirteenth aspect, wherein a minimum value of the second voltage by the secondary battery is larger than a maximum value of the first voltage by the fuel cell and the third voltage for operating the accessory system.

According to such a structure, as the second voltage is set to be within a desirable range, the power supplying system can operate in a mode in which more regenerative power is used to charge the secondary battery before supplying the regenerative power to the accessory system through the second power converter when the load generates the regenerative power.

A sixteenth aspect of the present invention provides a DC-DC converter based on the thirteenth aspect, wherein the third voltage for operating the accessory system is equal to a maximum value of the first voltage by the fuel cell or higher, and is equal to a minimum value of the second voltage by the secondary battery or lower.

According to such a structure, as the third voltage is set to be within a desirable range, the power supplying system can employ general-purpose and inexpensive accessories for the accessory system with the number of cells in a stack of the fuel cell being reduced.

A seventeenth aspect of the present invention provides a DC-DC converter based on the sixteenth aspect, wherein the accessory system further includes:

a vehicular accessory including a lighting system of a vehicle; and a bucking device which is connected between the second feeding path to the accessory system and the vehicular accessory, and which bucks the third voltage to convert the third voltage into a fifth voltage that is a maximum voltage for the vehicular accessory.

According to such a structure, the power supplying system can supply power from the fuel cell and from the secondary battery in a parallel manner through the second feeding path not only to the fuel-cell accessory which is a high-voltage system but also to a vehicular accessory which is a low-voltage system, so that system elements in the accessory system to which power can be stably supplied can be increased. Moreover, the power supplying system is appropriate for a fuel cell electric vehicle.

An eighteenth aspect of the present invention provides a DC-DC converter based on the sixteenth aspect, wherein the accessory system further includes a vehicle-compartment air conditioner operated by the third voltage.

According to such a structure, the power supplying system can increase system elements to which power can be stably supplied, and is appropriate for a fuel cell electric vehicle.

A nineteenth aspect of the present invention provides a DC-DC converter based on the thirteenth aspect, According to such a structure, at the time of activation of the fuel cell, the power supplying system supplies power to the accessory system from the secondary battery through the second power converter, so that power can be supplied to the fuel-cell accessory not through the first power converter from the secondary battery.

A twentieth aspect of the present invention provides a DC-DC converter based on the thirteenth aspect, According to such a structure, after the activation of the fuel cell, when the fuel cell becomes able to generate power sufficient to operate the fuel-cell accessory, the power supplying system terminates a bucking operation by the second power converter, resulting in suppression of any unnecessary discharging of the secondary battery.

A twenty-first aspect of the present invention provides a DC-DC converter based on the thirteenth aspect, further comprising:

a power-generating-level detecting unit which detects a power-generating level by the fuel cell; and an electricity storage level detecting unit which detects a electricity storage level by the secondary battery, wherein when the power-generating-level detecting unit detects that the fuel cell is generating power sufficient to operate the load, and when the electricity storage level detecting unit detects that the electricity storage level by the secondary battery is higher than a predetermined level, and when electric power regeneration is caused by the load, the backflow prevention switching device of the second power converter is turned on to buck a voltage of regenerative power to the third voltage for operating the accessory system, and the bucked regenerative power is supplied to the accessory system through the second feeding path.

According to such a structure, when the secondary battery cannot accept regenerative power, the power supplying system causes the accessory system to consume excessive regenerative energy. The predetermined level for the electricity storage level of the secondary battery is a level when there is no margin for taking in regenerative power.

According to the present invention, the DC-DC converter performs boosting of one input voltage and bucking of another input voltage at different timings, and can stably output a voltage with a constant value for both input voltages by adjusting the boosting ratio and the bucking ratio even if the two input voltages are in different voltage ranges. Therefore, as the DC-DC converter of the present invention is applied to a power supplying system that supplies power from two DC power sources which are a fuel cell and a secondary battery to a load, the power supplying system can be stably operated.

Moreover, according to the present invention, even if a voltage of the power source in the power supplying system varies, the power supplying system can be stably operated, and a cost for building the power supplying system can be reduced. Furthermore, as the power supplying system can be stably operated, any reduction of system efficiency can be suppressed.

BRIEF DESCRIPTION OF THE DRAWINGS

FIG. 14A is a diagram showing a structure of a second specific example of the transformer in the DC-DC converter of the first embodiment of the present invention, and shows an assembling process;

FIG. 14B is a diagram showing the structure of the second specific example of the transformer in the DC-DC converter of the first embodiment of the present invention, and shows a cross-sectional shape;

FIG. 15 is a circuit diagram showing a DC-DC converter according to a second embodiment of the present invention;

DETAILED DESCRIPTION OF THE PREFERRED EMBODIMENTS

A detailed explanation will be given of a DC-DC converter of the present invention and a power supplying system equipped with the same according to an embodiment of the present invention with reference to the accompanying drawings.

The explanation below will be given of the following order: 1. structure of power supplying system; 2. structure of DC-DC converter of first embodiment; 3. operation of DC-DC converter; 4. operation of power supplying system; 5. structure of transformer in DC-DC converter of first embodiment; 6. structure of DC-DC converter of second embodiment; and 7. structure of transformer in DC-DC converter of second embodiment.

<1. Structure of Power Supplying System>

Figure 1:
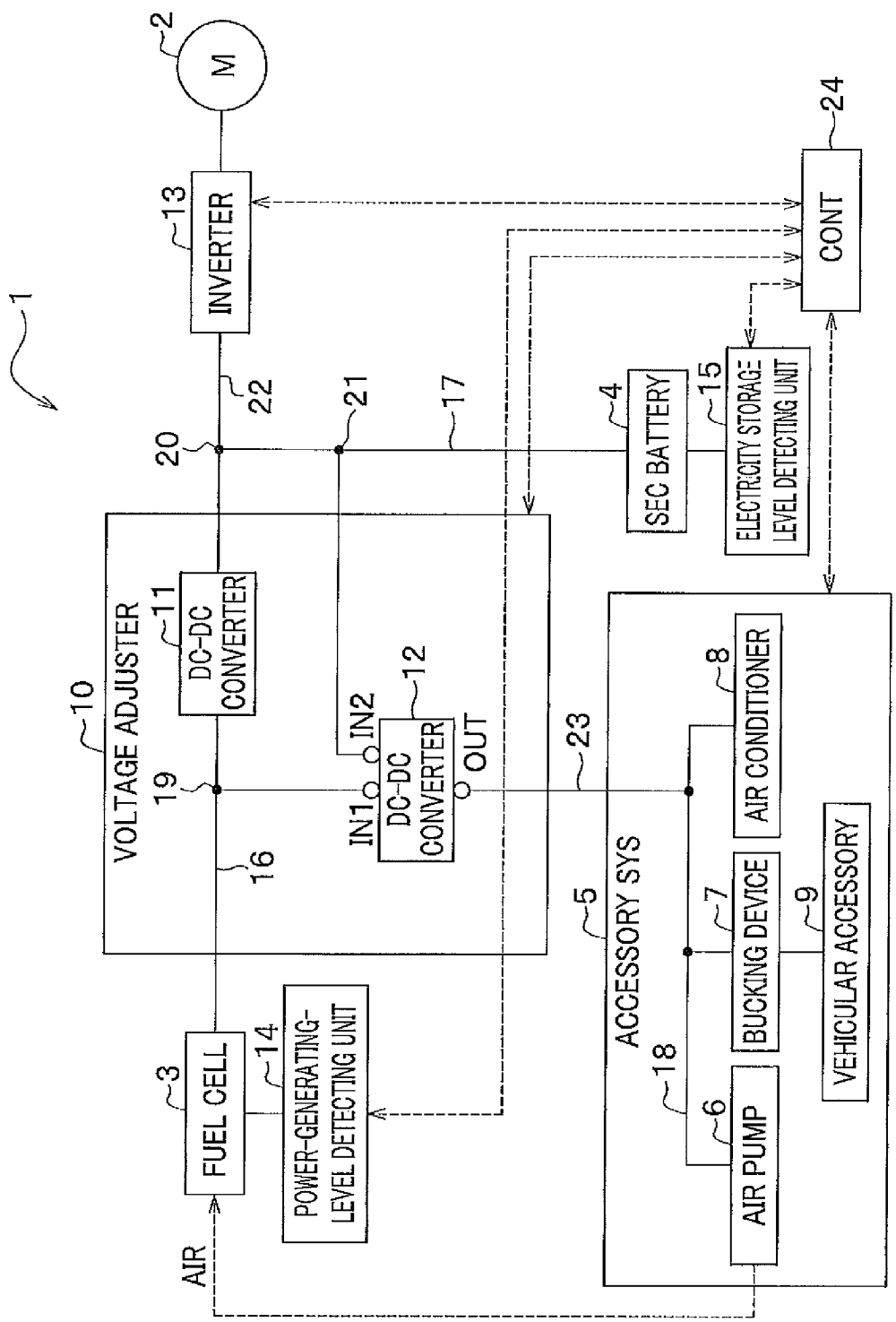
FIG. 1 is a diagram showing a configuration of a power supplying system according to an embodiment of the present invention.

A power supplying system 1 of the present embodiment is exemplified as that built in a fuel cell electric vehicle (FCEV). As shown in FIG. 1, the power supplying system 1 mainly comprises a fuel cell 3 and a secondary battery 4 for parallel feeding to a motor 2 that is a load, an accessory system 5 to which the fuel cell 3 and the secondary battery 4 can supply power in a parallel manner, and a voltage adjuster 10 which adjusts a voltage among the load, the fuel cell 3, the secondary battery 4, and the accessory system 5.

The motor 2 is, for example, a main motor for wheel driving.

The fuel cell 3 is a DC power source, and is a fuel cell of, for example, a PEM (Proton Exchange Membrane) type, and has plural cells stacked together.

The secondary battery 4 is a DC power source, and is, for example, a lithium ion battery.

The accessory system 5 includes an air pump 6, a bucking device 7, an air conditioner 8, and a vehicular accessory 9. The air pump 6 compresses air (oxidant gas) and supplies the compressed air to the fuel cell 3. Although the air pump 6 is exemplified as an example of the accessory for the fuel cell, it is not illustrated in the drawing but the fuel-cell accessory includes a fuel gas supply system which supplies a high-pressure hydrogen gas (fuel gas), etc.

The bucking device 7 bucks a high voltage supplied to the accessory system 5 and supplies the bucked voltage to the vehicular accessory 9, and comprises a DC-DC converter for bucking.

The air conditioner (an air conditioner for vehicle compartment) 8 is an accessory driven by a high voltage supplied to the accessory system 5.

The vehicular accessory 9 is, for example, lighting systems for the vehicle. Only one vehicular accessory 9 is shown in FIG. 1, but the number of vehicular accessories 9 is not limited to this number. The vehicular accessory 9 can include, for example, electric car accessories, such as power windows and wipers, and equipments, such as an audio system and a car navigation system.

It is not illustrated in the drawing but the accessory system 5 may further include a DC-DC converter which adjusts a voltage supplied to the accessory system 5 between a low-voltage system and a high-voltage system, and a low-voltage battery of 12 V.

The voltage adjuster 10 includes a DC-DC converter 11 (first power converter) comprised of a unidirectional booster which is capable of voltage conversion at a ratio of equal to one times or greater, and a DC-DC converter 12 (second power converter) of the present embodiment of the present invention.

The DC-DC converter performs a unidirectional boosting operation at a ratio of equal to one times or greater, and a unidirectional bucking operation at a ratio of equal to one times or less at different timings.

The DC-DC converter 11 has a low-voltage side connected to the fuel cell 3 through a first bus 16, and has a high-voltage side connected to the motor 2 via an inverter 13 through a first feeding path 22. Moreover, the secondary battery 4 is connected to the first feeding path 22 via a junction 20 through a second bus 17. That is, the fuel cell 3 and the secondary battery 4 are connected to the motor 2 so as to be able to supply power thereto via the first feeding path 22 through the first bus 16 and the second bus 17, respectively.

The DC-DC converter 12 has a first-voltage-side port IN1 which is an input port connected to the first bus 16 via a junction 19. Moreover, the DC-DC converter 12 has a second-voltage-side port IN2 which is another input port connected to the second bus 17 via a junction 21. The DC-DC converter 12 further has a third-voltage-side port OUT which is an output port connected to a second feeding path 23. In other words, the fuel cell 3 is connected to the accessory system 5 so as to be able to supply power thereto through the first bus 16, the DC-DC converter 12, and the second feeding path 23, and the secondary battery 4 is also connected to the accessory system 5 so as to be able to supply power thereto through the second bus 17, the DC-DC converter 12, and the second feeding path 23. Furthermore, the second feeding path 23 to the accessory system 5 is connected to a third bus 18. The third bus 18 is connected to the air pump 6, the bucking device 7, and the air conditioner 8.

The system elements of the power supplying system 1 are controllable by a controller 24. That is, the controller 24 can output, for example, an operation control signal to each DC-DC converter 11, 12 of the voltage adjuster 10, an operation control signal to the inverter 13, and an operation control signal to the accessory system 5. The controller 24 comprises, for example, an ECU (Electronic Control Unit). The controller 24 will be discussed in detail later together with an operation of the power supplying system 1 discussed later.

In the present embodiment, as shown in FIG. 1, the fuel cell 3 has a power-generating-level detecting unit 14. The power-generating-level detecting unit 14 is a device of detecting an output current, an output voltage, etc., by the fuel cell 3 in order to detect the power generating level by the fuel cell 3. The power-generating-level detecting unit 14 comprises an ammeter, a voltmeter, etc., and is connected to the output terminal of the fuel cell 3. Moreover, the power-generating-level detecting unit 14 is also connected to the controller 24, so that the controller 24 can monitor the power generating level (an output current, an output voltage, etc.,) of the fuel cell 3.

Moreover, according to the present embodiment, as shown in FIG. 1, the secondary battery 4 has a electricity storage level detecting unit 15. The electricity storage level detecting unit 15 is a device of detecting an output current by the secondary battery 4 in order to detect the electricity storage level of the secondary battery 4. The electricity storage level detecting unit 15 comprises, for example, an ammeter, and is connected to the output terminal of the secondary battery 4. Moreover, the electricity storage level detecting unit 15 is also connected to the controller 24, so that the controller 24 can calculate a power-storing level by integration of values of a current released from the secondary battery 4 or a current charged therein (hereinafter, simply called a battery current), and by division of the integrated battery current value by the battery capacity of the secondary battery 4. Accordingly, the power-storing level of the secondary battery 4 can be monitored. Note that when the electricity storage level detecting unit 15 comprises a voltmeter or the like, it is possible for the controller 24 to acquire the power-storing level by using a voltage/power-storing level characteristic acquired beforehand and a detected voltage.

<Relationship Among Voltages of System Elements in Power Supplying System>

In the following explanation, an output voltage by the fuel cell 3 is called a first voltage. An output voltage by the secondary battery 4 is called a second voltage. A drive voltage for the accessory system 5 is called a third voltage. A voltage acquired through boosting by the DC-DC converter 11 is called a fourth voltage. A low voltage acquired through bucking on the third voltage by the bucking device 7 in the accessory system 5 is called a fifth voltage.

In the magnitude relation among voltage values $V_1$, $V_2$, and $V_3$ of the first voltage, the second voltage, and the third voltage, respectively, it is preferable that the value $V_3$ of the third voltage for the accessory system 5 is equal to the maximum value $V_1(\text{max})$ of the first voltage by the fuel cell 3 or higher. Moreover, it is preferable that the value $V_3$ of the third voltage for driving the accessory system 5 is smaller than the minimum value $V_2(\text{min})$ of the second voltage by the secondary battery 4.

Under such preferable conditions, respective values of the first to fifth voltages will be exemplified.

The value $V_1$ of the first voltage by the fuel cell 3 is, for example, from 150 to 300 V.

The value $V_2$ of the second voltage by the secondary battery 4 is, for example, from 400 to 600 V.

The value $V_3$ of the third voltage for the accessory system 5 is, for example, a constant value which is 300 V.

The value $V_4$ of the fourth voltage output by the DC-DC converter 11 is, for example, 300 to 700 V.

The value $V_5$ of the fifth voltage output by the bucking device 7 is, for example, 12 V.

In this case, the vehicular accessory 9 is a 12-V device driven by the voltage of 12 V.

<2. Structure of DC-DC Converter of First Embodiment>

Figure 2:
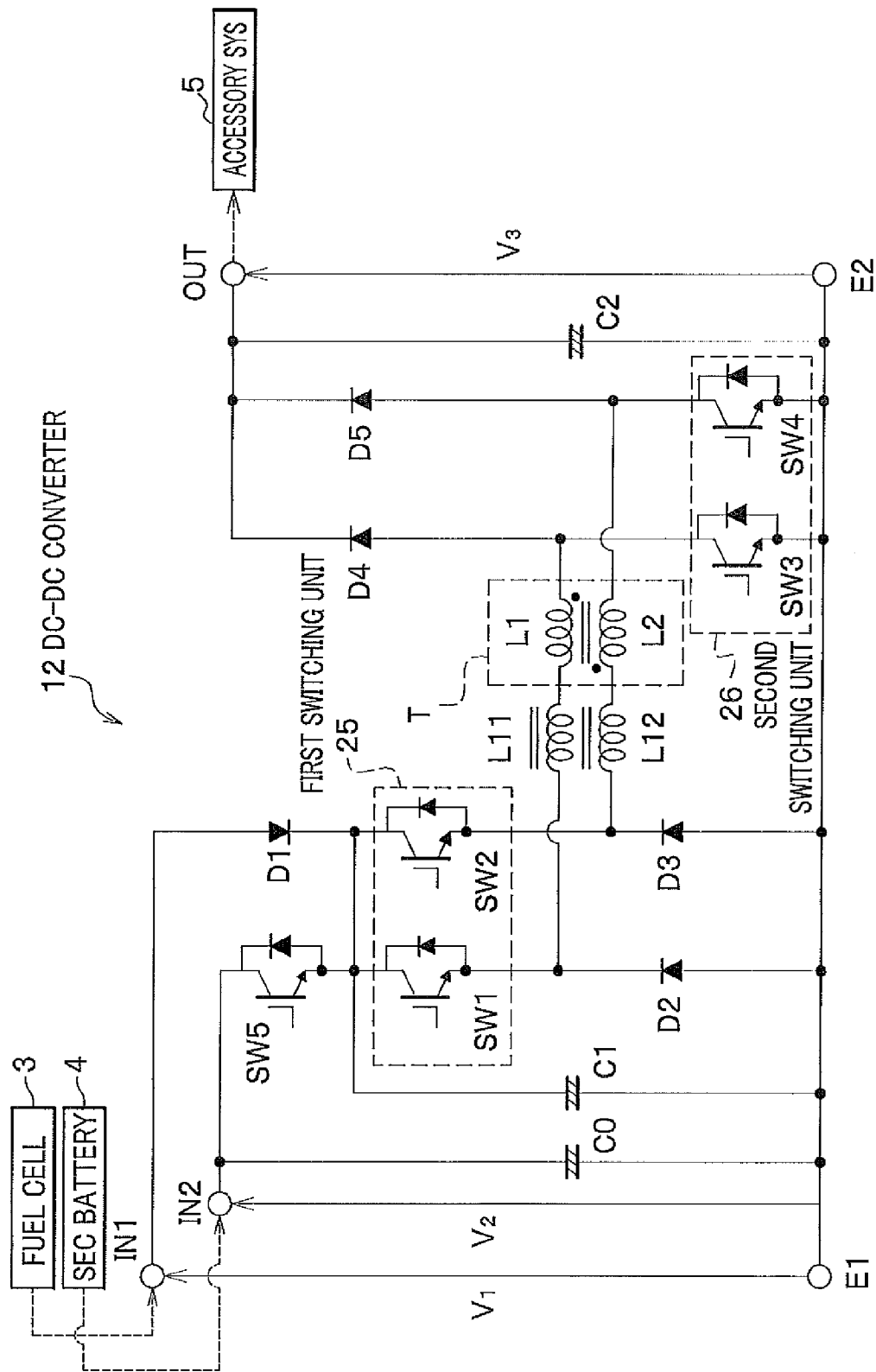
FIG. 2 is a circuit diagram of a DC-DC converter according to a first embodiment of the present invention.

The DC-DC converter 12 of the first embodiment has, as shown in FIG. 2, reference-voltage terminals E1, E2 common for inputting/outputting in addition to the first-voltage-side port IN1, the second-voltage-side port IN2, and the third-voltage-side port OUT. Moreover, the DC-DC converter 12 has plural switching devices SW1 to SW5, plural diodes D1 to D5, plural smoothing capacitors C0 to C2, plural inductors L11, L12, and a transformer T among respective ports and terminals.

The transformer T is a magnetic field canceling transformer having a core and a primary winding L1 and a secondary winding L2 both wound around the core. The magnetic field canceling transformer has the primary winding L1 and the secondary winding L2 which are magnetically coupled together via the core, and which are connected together to have reverse windings (connected to the switches SW1 and SW2 to have opposite current directions) at a substantially same turn ratio. Accordingly, magnetic field between two reactors is cancelled to reduce the possibility of magnetic saturation of each reactor, and as a result, the whole core and coil can be miniaturized and light-weighted. Note that the detailed structure of the transformer T will be discussed later.

The smoothing capacitor C0 is connected between the reference-voltage terminal E1 and the second-voltage-side port IN2, and the smoothing capacitor C2 is connected between the reference-voltage terminal E2 and the third-voltage-side port OUT. Moreover, the smoothing capacitor C1 is connected between the reference-voltage terminal E1 and one end of a backflow prevention switching device SW5.

The backflow prevention switching device SW5 has another end connected to the second-voltage-side port IN2, and the one end thereof is connected to one end of the first switching device SW1. The first switching device SW1 has another end coupled to one end of the primary winding L1. In the present embodiment, another end of the first switching device SW1 is connected to one end of the primary winding L1 of the transformer T via the inductor L11.

The backflow prevention diode D1 has an anode connected to the first-voltage-side port IN1, and has a cathode connected to one end of the second switching device SW2. The second switching device SW2 has another end coupled to one end of the secondary winding L2 of the transformer T. In the present embodiment, another end of the second switching device SW2 is connected to one end of the secondary winding L2 of the transformer T via the inductor L12.

The first switching device SW1 and the second switching device SW2 together form a first switching unit 25. One end of the first switching device SW1 is connected to one end of the second switching device SW2. Another end of the first switching device SW1 is connected to the cathode of the first diode D2. The anode of the first diode D2 is connected to the reference-voltage terminal E1. Another end of the second switching device SW2 is connected to the cathode of the second diode D3. The anode of the second diode D3 is connected to the reference-voltage terminal E1.

The third switching device SW3 and the fourth switching device SW4 together form a second switching unit 26. One end of the third switching device SW3 is connected to another end of the primary winding L1 of the transformer T, while another end of the third switching device SW3 is connected to the reference-voltage terminal E2.

One end of the fourth switching device SW4 is connected to another end of the secondary winding L2 of the transformer T, while another end of the fourth switching device SW4 is connected to the reference-voltage terminal E2.

The anode of the third diode D4 is connected to another end of the primary winding L1 of the transformer T, while the cathode of the third diode D4 is connected to the third-voltage-side port OUT.

Furthermore, the anode of the fourth diode D5 is connected to another end of the secondary winding L2 of the transformer T, while the cathode of the fourth diode D5 is connected to the third-voltage-side port OUT.

The switching devices SW1 to SW5 are each, for example, an IGBT (Insulated Gate Bipolar Transistor) resistible to large current and high voltage. The switching devices SW1 to SW5 each have a collector, an emitter, and a base. A diode is connected in a parallel to each switching device SW1 to SW5 between the collector and the emitter of each switching device SW1 to SW5. That is, the switching devices SW1 to SW5 are each an IGBT with a flywheel diode. When there is a fast-speed and high-frequency requisition, a MOSFET (Metal Oxide Semiconductor Field Effect Transistor) can be used as needed. Furthermore, as the switching device, an SiC transistor, a GaN transistor, etc., having high-voltage and environmental-resistant characteristics may be used.

<3. Operation of DC-DC Converter>

An explanation will be given of the operation of the DC-DC converter 12 of the first embodiment divided into 3-1. input port switching operation, 3-2, switching operation at the time of boosting, and 3-3. switching operation at the time of bucking, with reference to FIGS. 3A to 7B (and FIGS. 1 and 2 as needed).

<3-1. Input Port Switching Operation>

The DC-DC converter 12 is a power converter having two inputs and one output, and performs an operation of boosting a voltage at the first-voltage-side port IN1 and an operation of bucking a voltage at the second-voltage-side port IN2 at different timings. Hence, the controller 24 (see FIG. 1) supplies ON-OFF control signals to the backflow prevention switching device SW5 of the DC-DC converter 12. An OFF control signal to the backflow prevention switching device SW5 is for maintaining the backflow prevention switching device SW5 in an OFF state in order to boost a voltage at the first-voltage-side port IN1, and is used at the time of boosting operation.

Conversely, the ON control signal to the backflow prevention switching device SW5 is for maintaining the backflow prevention switching device SW5 in an ON state in order to buck a voltage at the second-voltage-side port IN2, and is mainly used at the time of bucking operation. Note that the signal used for maintaining the backflow prevention switching device SW5 in an ON state is also used at the time of regeneration of a current from the third-voltage-side port OUT to the second-voltage-side port IN2. Because the DC-DC converter 12 has the backflow prevention switching device SW5, it is possible to prevent the regenerative current from flowing back to the first-voltage-side port IN1.

For the purpose of mainly performing an input port switching operation, the controller 24 controls the ON-OFF operation of the backflow prevention switching device SW5, and switches flowing/cutoff of a current from the second-voltage-side port IN2 to the third-voltage-side port OUT. More specifically, as the backflow prevention switching device SW5 turns on, a current is allowed to flow from the second-voltage-side port IN2 to the third-voltage-side port OUT. Conversely, as the backflow prevention switching device SW5 turns off, this current is cut off. Because the DC-DC converter 12 has the backflow prevention diode D1, it is possible to prevent a current which flows when the backflow prevention switching device SW5 turns on from flowing back to the first-voltage-side port IN1. An explanation will now be given of a switching operation when the backflow prevention switching device SW5 is in an OFF state and of a switching operation when the backflow prevention switching device SW5 is in an ON state, respectively.

<3-2. Switching Operation in Boosting>

An explanation will be given of, time by time, the operation of the DC-DC converter 12 along with a timing chart for a gate signal used for the switching operation at the time of boosting.

<<3-2-1. Gate Signal in Boosting>>

In boosting, the controller 24 supplies ON-OFF control signals to the third switching device SW3 and the fourth switching device SW4 both in the second switching unit 26 (see FIG. 2). The ON-OFF control signals to the third switching device SW3 and to the fourth switching device SW4 cause the fourth switching device SW4 to become an OFF state conversely when the third switching device SW3 is caused to become an ON state. Moreover, such control signals cause the fourth switching device SW4 to become an ON state when the third switching device SW3 is caused to become an OFF state. That is, such control signals make the operation of the third switching device SW3 and that of the fourth switching device SW4 inverted.

Figure 3A:
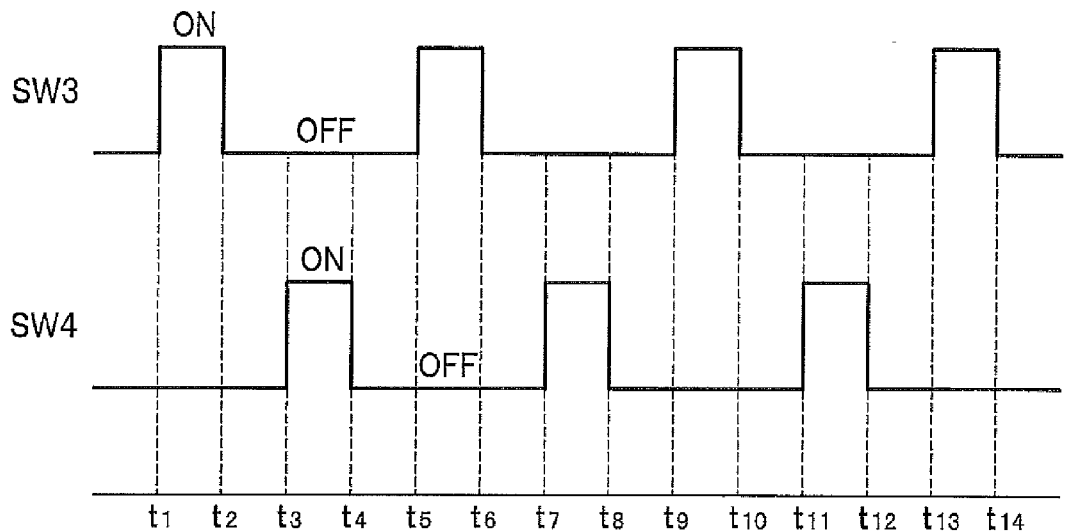
FIG. 3A is an example of a timing chart for a gate signal of a switching device in the DC-DC converter of the first embodiment of the present invention, and shows a gate signal of a second switching unit at the time of boosting;[

In the present embodiment, the controller 24 (see FIG. 1) outputs gate signals having respective waveforms shown in FIG. 3A as an example to the third switching device SW3 and to the fourth switching device SW4 at predetermined timings. The gate signal to the third switching device SW3 and the gate signal to the fourth switching device SW4 are pulse-waveform signals having the same duty cycle and the same duration but having respective phases shifted so that the third switching device SW3 and the fourth switching device SW4 do not turn on at the same time. For example, the duty cycle of the third switching device SW3 is from time $t_1$ to time $t_5$, which is same as the duty cycle of the fourth switching device SW4 that is from time $t_3$ to time $t_7$. In the present embodiment, duty ratio indicating a duration that the gate signal is ON are all set to be 25%.

Based on such gate signals, the third switching device SW3 and the fourth switching device SW4 alternately repeat ON-OFF operations. It is possible to arbitrary change the duty which sets the on time of the third switching device SW3 and that of the fourth switching device SW4 at a rate equal to 50% or less in order to avoid simultaneous turn-on. Accordingly, a voltage $V_3$ output at the third-voltage-side port OUT is boosted within a range from one to two times the voltage $V_1$ input in the first-voltage-side port IN1. Table 1 shows operational states of all switches corresponding to a gate signal having a waveform shown in FIG. 3A. In table 1, four intervals: a time from $t_3$ to $t_4$; a time from $t_4$ to $t_5$; a time from $t_5$ to $t_6$; and a time from $t_6$ to $t_7$ are exemplified.

TABLE 1

|     | --- | $t_3$ to $t_4$ | $t_4$ to $t_5$ | $t_5$ to $t_6$ | $t_6$ to $t_7$ | --- |
| --- | --- | --- | --- | --- | --- | --- |
| SW5 |     | OFF | OFF | OFF | OFF |     |
| SW1 |     | ON  | ON  | ON  | ON  |     |
| SW2 |     | ON  | ON  | ON  | ON  |     |
| SW3 |     | OFF | OFF | ON  | OFF |     |
| SW4 |     | ON  | OFF | OFF | OFF |     |

That is, the backflow prevention switching device SW5 is always in an OFF state. The first and second switching devices SW1, SW2 are always in an ON state. The third and fourth switching devices SW3, SW4 repeat ON-OFF operations with respective operations being inverted. An explanation will now be given of respective operations corresponding to the four intervals shown in table 1.

<<3-2-2. Operation During Period from $t_3$ to $t_4$>>

As shown in FIG. 3A and table 1, during a period from $t_3$ to $t_4$, the third switching device SW3 is in an OFF state, and the fourth switching device SW4 is in an ON state. Because the first and second switching devices SW1, SW2 are always in an ON state, as is indicated by a solid line arrow in FIG. 4A, an excitation current flows from the first-voltage-side port IN1 to the inductor L12 and to the secondary winding L2 of the transformer T through the backflow prevention diode D1 and the second switching device SW2. At this time, a voltage is generated at the secondary winding L2 of the transformer T, and an induced current is allowed to flow through the primary winding L1 by mutual induction. At this time, magnetic energy is accumulated in the inductors L11, L12.

Figure 4A:
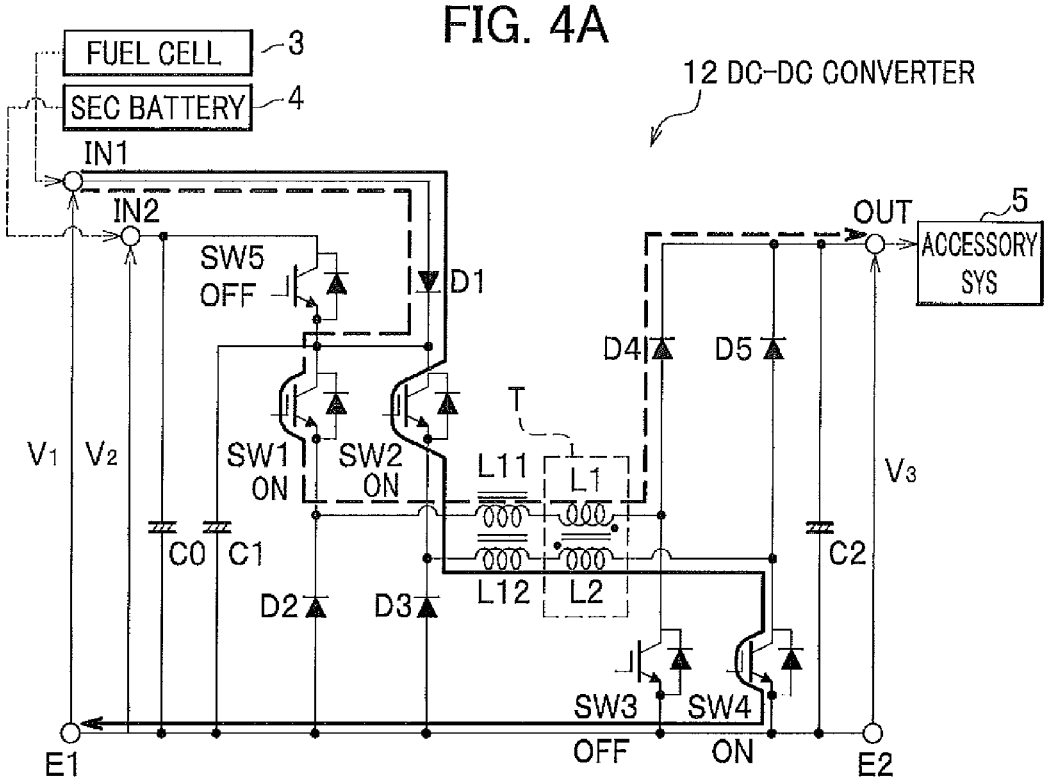
FIG. 4A is a diagram for explaining a boosting operation in the DC-DC converter of the first embodiment of the present invention corresponding to the gate signal in FIG. 3A, and shows an operation in a time interval from $t_3$ to $t_4$.

As is indicated by a dashed arrow in FIG. 4A, the induced current flows to the third-voltage-side port OUT through the third diode D4. The smoothing capacitor C2 is charged by this induced current, and as a result, a DC voltage $V_3$ is output at the third-voltage-side port OUT in accordance with the induced current. The DC voltage $V_3$ becomes larger than the input voltage $V_1$ by what corresponds to a sum of induced electromotive force by the inductor L11 and induced electromotive force by the primary and secondary windings L1, L2 of the transformer T. The DC-DC converter 12 can boost the input voltage $V_1$ to a desired value within a range from one to two times in accordance with the set duty.

<<3-2-3. Operation During Period from $t_4$ to $t_5$>>

As shown in FIG. 3A and table 1, during a period from $t_4$ to $t_5$, both third switching device SW3 and fourth switching device SW4 are in an OFF state. The first and second switching devices SW1, SW2 are always in an ON state. In this case, because of magnetic energy accumulated in the inductors L11, L12, as is indicated by a solid line arrow in FIG. 4B, a current flows from the first-voltage-side port IN1 to the inductor L12 and to the secondary winding L2 of the transformer T through the backflow prevention diode D1 and the second switching device SW2, and further flows into the third-voltage-side port OUT through the fourth diode D5.

Figure 4B:
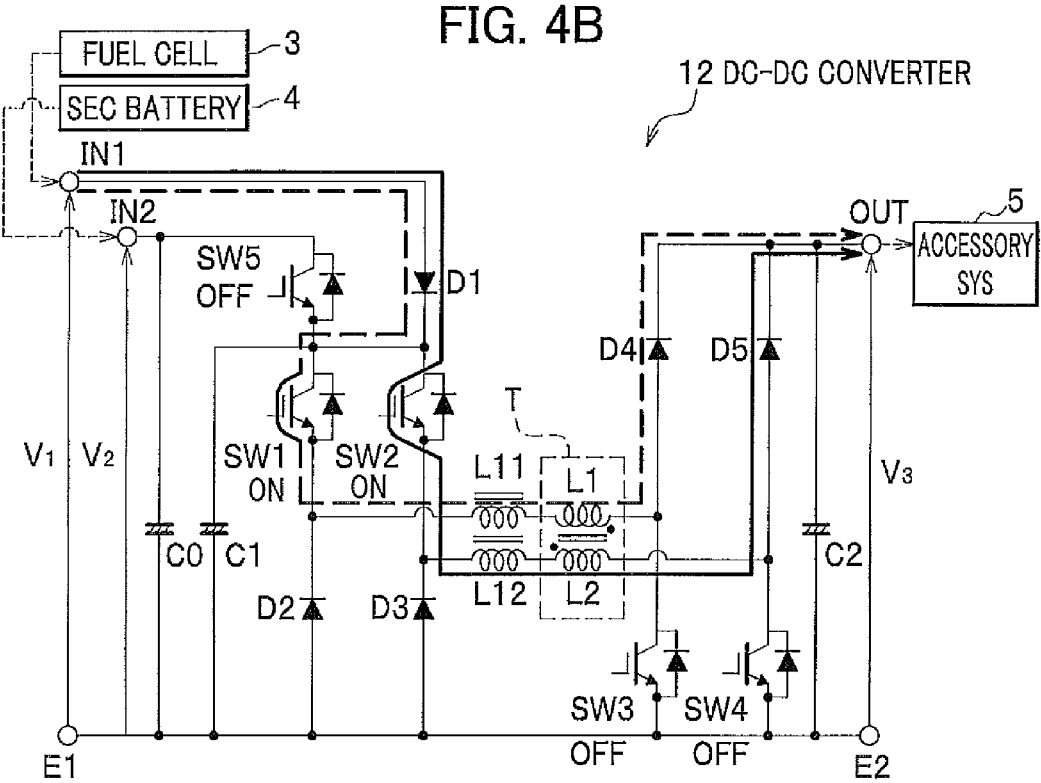
FIG. 4B is a diagram for explaining a boosting operation in the DC-DC converter of the first embodiment of the present invention corresponding to the gate signal shown in FIG. 3A, and shows an operation in a time interval from $t_4$ to $t_s$.

Likewise, because of magnetic energy accumulated in the inductors L11, L12, as is indicated by a dashed arrow in FIG. 4B, a current flows from the first-voltage-side port IN1 to the inductor L11 and to the primary winding L1 of the transformer T through the backflow prevention diode D1 and the first switching device SW1, and further flows into the third-voltage-side port OUT through the third diode D4. As a result, a DC voltage $V_3$ is output at the third-voltage-side port OUT.

<<3-2-4. Operation During a Period from $t_5$ to $t_6$>>

As shown in FIG. 3A and table 1, during a period from $t_5$ to $t_6$, the third switching device SW3 is in an ON state, and the fourth switching device SW4 is in an OFF state. Moreover, because the first and second switching devices SW1, SW2 are always in an ON state, as is indicated by a solid line arrow in FIG. 5A, a current flows from the first-voltage-side port IN1 to the inductor L11 and to the primary winding L1 of the transformer T through the backflow prevention diode D1 and the first switching device SW1. At this time, a voltage is generated at the primary winding L1 of the transformer T, and an induced current is caused to flow through the secondary winding L2 by mutual induction. At this time, the inductors L11, L12 accumulate magnetic energy. The induced current flows, as is indicated by a dashed arrow in FIG. 5A, into the third-voltage-side port OUT through the fourth diode D5. As a result, a DC voltage $V_3$ is output at the third-voltage-side port OUT.

<<3-2-5. Operation During Period from $t_6$ to $t_7$>>

Figure 5A:
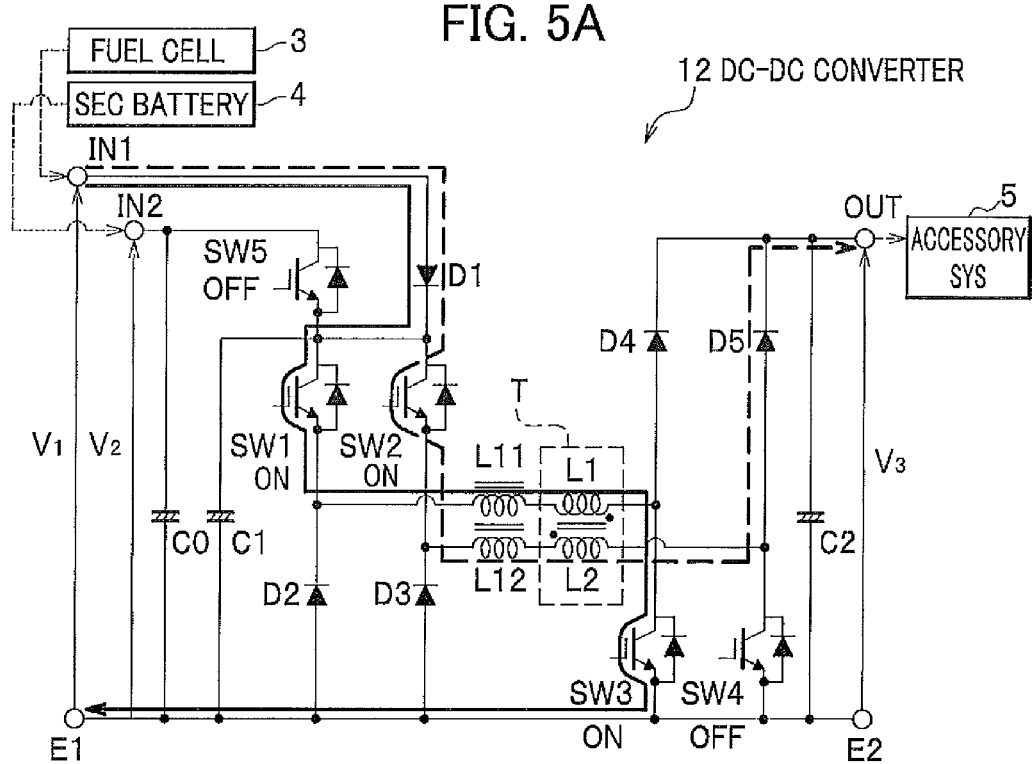
FIG. 5A is a diagram for explaining a boosting operation in the DC-DC converter of the first embodiment of the present invention corresponding to the gate signal shown in FIG. 3A, and shows an operation in a time interval from $t_5$ to $t_6$.
Figure 5B:
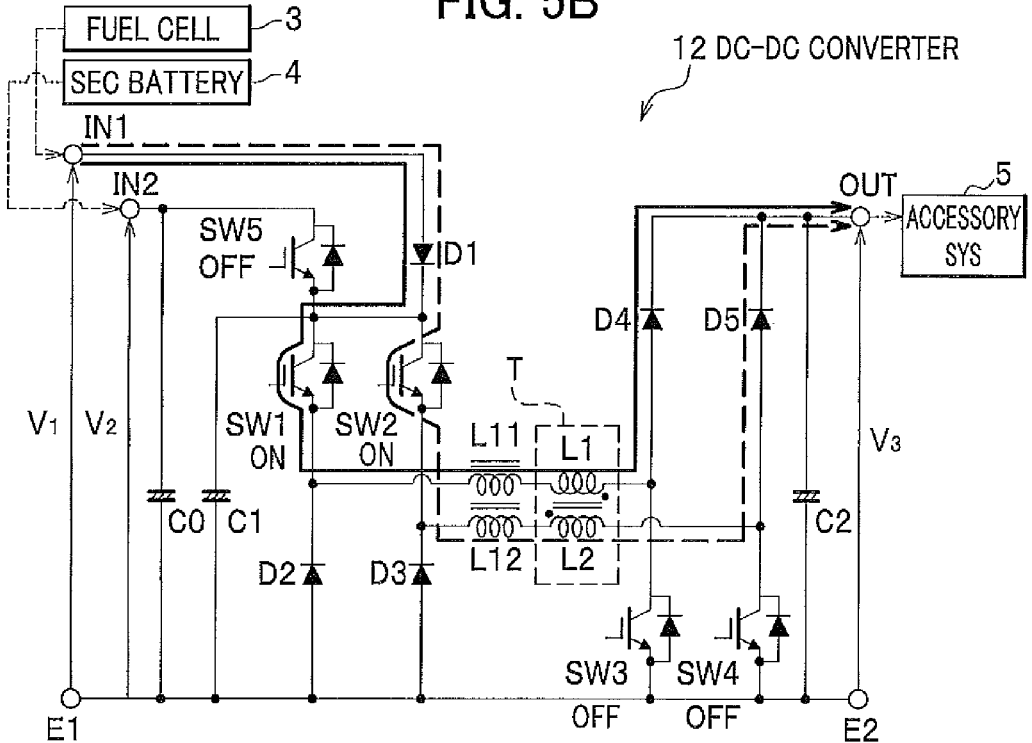
FIG. 5B is a diagram for explaining a boosting operation in the DC-DC converter of the first embodiment of the present invention corresponding to the gate signal shown in FIG. 3A, and shows an operation in a time interval from $t_6$ to $t_7$.

As shown in FIG. 3A and table 1, during a period from $t_6$ to $t_7$, the states of respective switching devices are same as those in the period from $t_4$ to $t_5$. Accordingly, as is shown in FIG. 5B, the operation in the period from $t_6$ to $t_7$ is same as the operation in the period from $t_4$ to $t_5$, so that duplicated explanation will be skipped. Note that in FIG. 5B, the kind of an arrow is shown so as to match the last period.

<3-3. Switching Operation at the Time of Bucking>

An explanation will now be given of an operation of the DC-DC converter 12 time by time in accordance with a timing chart for a gate signal used for a switching operation at the time of bucking.

<<3-3-1. Gate Signal at the Time of Bucking>>

At the time of bucking, the controller 24 (see FIG. 1) supplies ON-OFF control signals to the first switching device SW1 and the second switching device SW2 both in the first switching unit 25 (see FIG. 2).

The ON-OFF control signals to the first and second switching devices SW1, SW2 cause the second switching device SW2 to become an OFF state conversely when the first switching device SW1 is caused to become ON state. Moreover, such control signals cause the first switching device SW1 to become OFF state when the second switching device SW2 is caused to become ON state. That is, those ON-OFF control signals make respective operations of the first and second switching devices SW1, SW2 inverted.

Figure 3B:
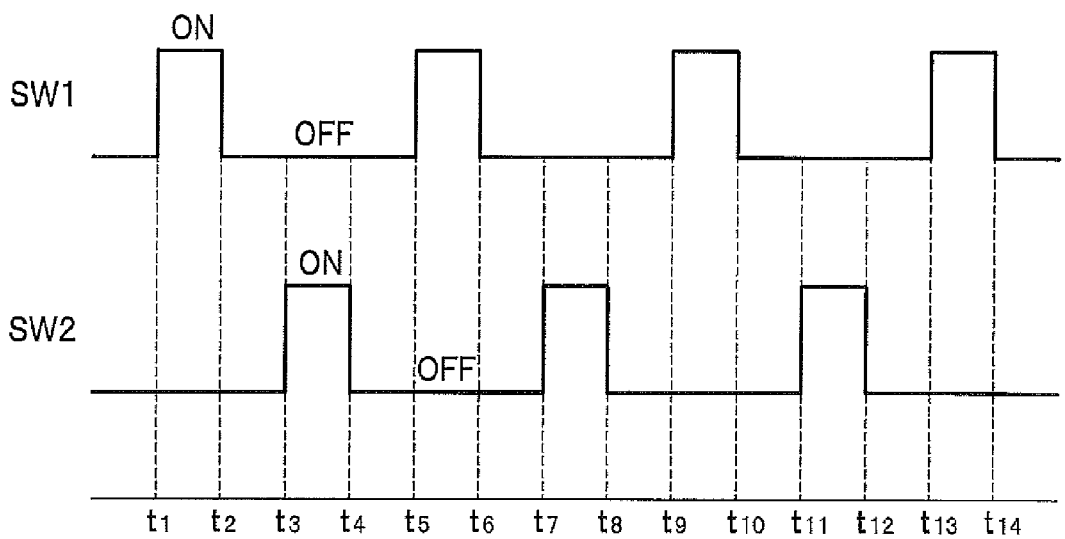
FIG. 3B is an example of a timing chart for a gate signal of a switching device in the DC-DC converter of the first embodiment of the present invention, and shows a gate signal of a first switching unit at the time of bucking.

In the present embodiment, the controller 24 (see FIG. 1) outputs gate signals having respective waveforms shown in FIG. 3B as an example to the first switching device SW1 and to the second switching device SW2 at predetermined timings. The gate signal to the first switching device SW1 and the gate signal to the second switching device SW2 are pulse-waveform signals having the same duty cycle and the same pulse duration but having respective phases shifted so that the first switching device SW1 and the second switching device SW2 do not turn on at the same time. For example, the period of the first switching device SW1 is from time $t_1$ to time $t_5$, which is same as the duration of the second switching device SW2 that is from time $t_3$ to time $t_7$. In the present embodiment, duty ratios indicating a ratio of pulse duration that the gate signal is ON are all set to be 25% of the period.

Based on such gate signals, the first switching device SW1 and the second switching device SW2 alternately repeat ON-OFF operations. It is possible to arbitrary change the duration which sets the on time of the first switching device SW1 and that of the second switching device SW2 at a rate equal to 50% or less in order to avoid simultaneous turn-on. Accordingly, a voltage $V_3$ output at the third-voltage-side port OUT is bucked within a range from 0.5 to 1 times the voltage $V_1$ input in the second-voltage-side port IN2. Table 2 shows operational states of all switches corresponding to a gate signal having a waveform shown in FIG. 3B. In table 2, four intervals: a time from $t_1$ to $t_2$; a time from $t_2$ to $t_3$; a time from $t_3$ to $t_4$; and a time from $t_4$ to $t_5$ are exemplified.

TABLE 2

|     | $T_1$ to $t_2$ | $T_2$ to $t_3$ | $T_3$ to $t_4$ | $T_4$ to $t_5$ |
| --- | --- | --- | --- | --- |
| SW5 | ON  | ON  | ON  | ON  |
| SW1 | ON  | OFF | OFF | OFF |
| SW2 | OFF | OFF | ON  | OFF |
| SW3 | OFF | OFF | OFF | OFF |
| SW4 | OFF | OFF | OFF | OFF |

That is, the backflow prevention switching device SW5 is always in ON state. The first and second switching devices SW1, SW2 alternately repeat ON-OFF operations with respective operations being inverted. The third and fourth switching devices SW3, SW4 are always in an OFF state.

<<3-3-2. Operation During Period from $t_1$ to $t_2$>>

As shown in FIG. 3B, during a period from $t_1$ to $t_2$, the first switching device SW1 is in an ON state, while the second switching device SW2 is in an OFF state. Because the third and fourth switching devices SW3, SW4 are always in an OFF state, as is indicated by a solid line arrow in FIG. 6A, a current (an excitation current) flowing from the second-voltage-side port IN2 to the inductor L11 and to the primary winding L1 of the transformer T through the first switching device SW1 flows into the third-voltage-side port OUT through the third diode D4. At this time, a voltage is generated at the primary winding L1 of the transformer T, and an induced current is caused to flow through the secondary winding L2 by mutual induction. At this time, the inductors L11, L12 accumulate magnetic energy.

Figure 6A:
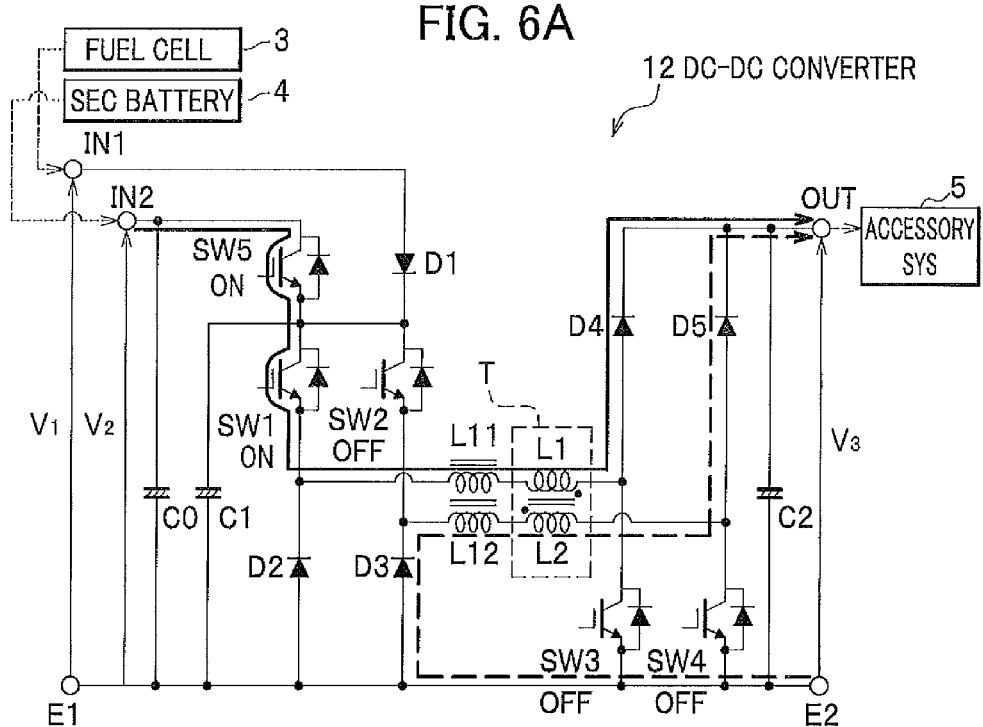
FIG. 6A is a diagram for explaining a bucking operation in the DC-DC converter of the first embodiment of the present invention corresponding to the gate signal shown in FIG. 3B, and shows an operation in a time interval from $t_1$ to $t_2$.
Figure 6B:
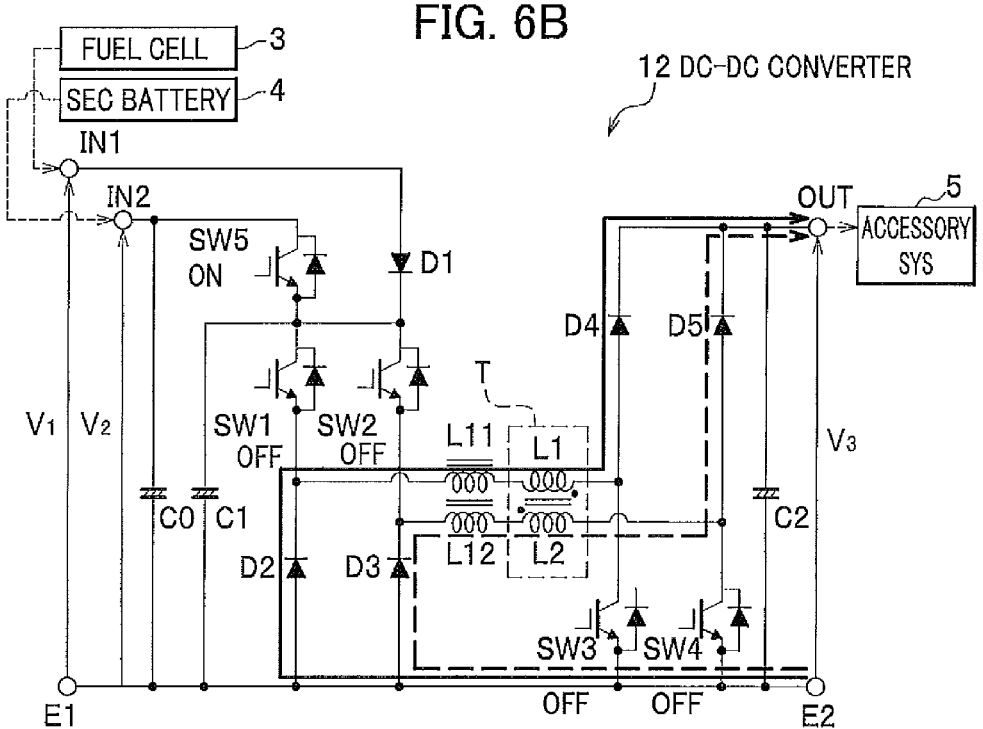
FIG. 6B is a diagram for explaining a bucking operation in the DC-DC converter of the first embodiment of the present invention corresponding to the gate signal shown in FIG. 3B, and shows an operation in a time interval from $t_2$ to $t_3$.

The induced current flows, as is indicated by a dashed arrow in FIG. 6A, into the third-voltage-side port OUT through the fourth diode D5. The smoothing capacitor C2 is charged by this induced current, and as a result, a DC voltage $V_3$ in accordance with the induced current is generated at the third-voltage-side port OUT. The DC voltage $V_3$ becomes smaller than the input voltage $V_2$ by what corresponds to a sum of induced electromotive force by the inductor L12 and induced electromotive force by the primary winding L1 and the secondary winding L2 of the transformer T. The DC-DC converter 12 can buck the input voltage $V_2$ to a desired value within a range from 0.5 to 1 time in accordance with a set duty.

<<3-3-3. Operation During Period from $t_2$ to $t_3$>>

As shown in FIG. 3B and table 2, during a period from $t_2$ to $t_3$, the first and second switching devices SW1, SW2 are both in an OFF state. Moreover, the third and fourth switching devices SW3, SW4 are always in an OFF state. In this case, because of magnetic energy accumulated in the inductors L11, L12, as is indicated by a solid line arrow in FIG. 6B, a current flows from the reference-voltage terminal E2 to the inductor L11 and to the primary winding L1 of the transformer T through the first diode D2, and flows into the third-voltage-side port OUT through the third diode D4. Likewise, because of magnetic energy accumulated in the inductors L11, L12, as is indicated by a dashed arrow in FIG. 6B, a current flows from the reference-voltage terminal E2 to the inductor L12 and to the secondary winding L2 of the transformer T through the second diode D3, and flows into the third-voltage-side port OUT through the fourth diode D5. As a result, a DC voltage $V_3$ is output at the third-voltage-side port OUT.

<<3-3-4. Operation During Period from $t_3$ to $t_4$>>

As shown in FIG. 3B and table 2, during a period from $t_3$ to $t_4$, the first switching device SW1 is in an OFF state, while the second switching device SW2 is in an ON state. Moreover, because the third and fourth switching devices SW3, SW4 are always in an OFF state, as is indicated by a solid line arrow in FIG. 7A, a current (an excitation current) flowing from the second-voltage-side port IN2 to the inductor L12 and to the secondary winding L2 of the transformer T through the second switching device SW2 flows into the third-voltage-side port OUT through the fourth diode D5. At this time, a voltage is generated at the secondary winding L2 of the transformer T, and an induced current is caused to flow through the primary winding L1 by mutual induction. At this time, the inductors L11, L12 accumulate magnetic energy. Moreover, the induced current flows, as is indicated by a dashed arrow in FIG. 7A, flows into the third-voltage-side port OUT through the third diode D4. As a result, a DC voltage $V_3$ is output at the third-voltage-side port OUT.

<<3-3-5. Operation During Period from $t_4$ to $t_5$>>

As shown in FIG. 3B and table 2, during a period from $t_4$ to $t_5$, the states of respective switches are same as those during the period from $t_2$ to $t_3$.

Figure 7A:
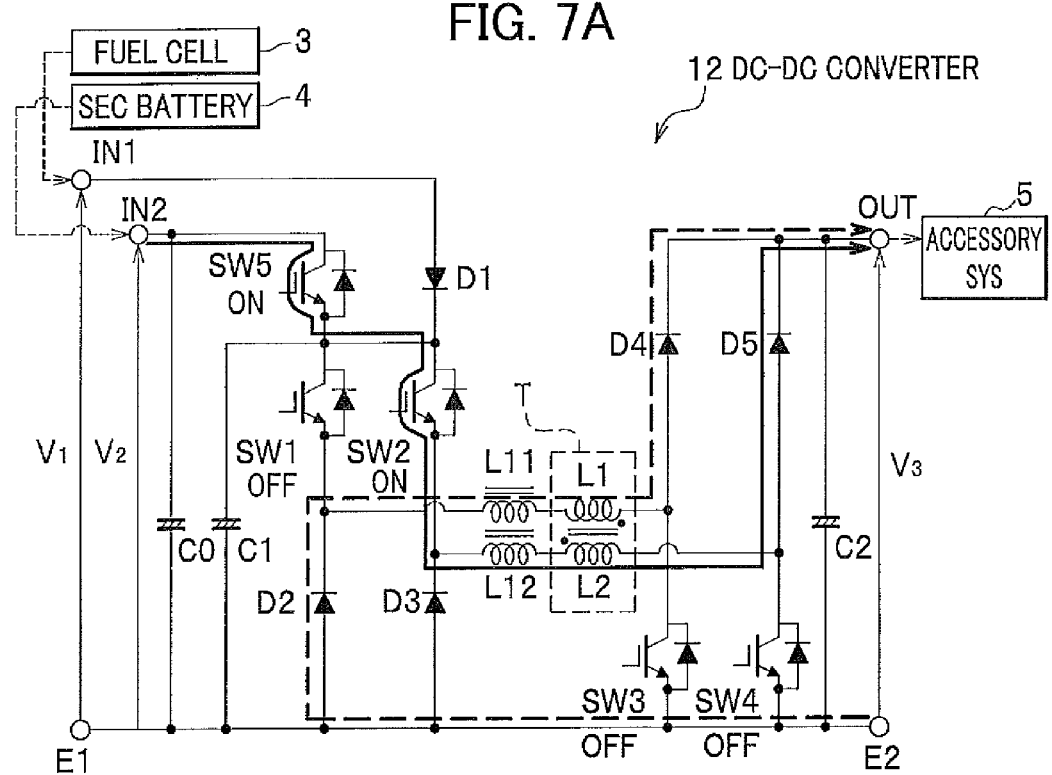
FIG. 7A is a diagram for explaining a bucking operation in the DC-DC converter of the first embodiment of the present invention corresponding to the gate signal shown in FIG. 3B, and shows an operation in a time interval from $t_3$ to $t_4$.
Figure 7B:
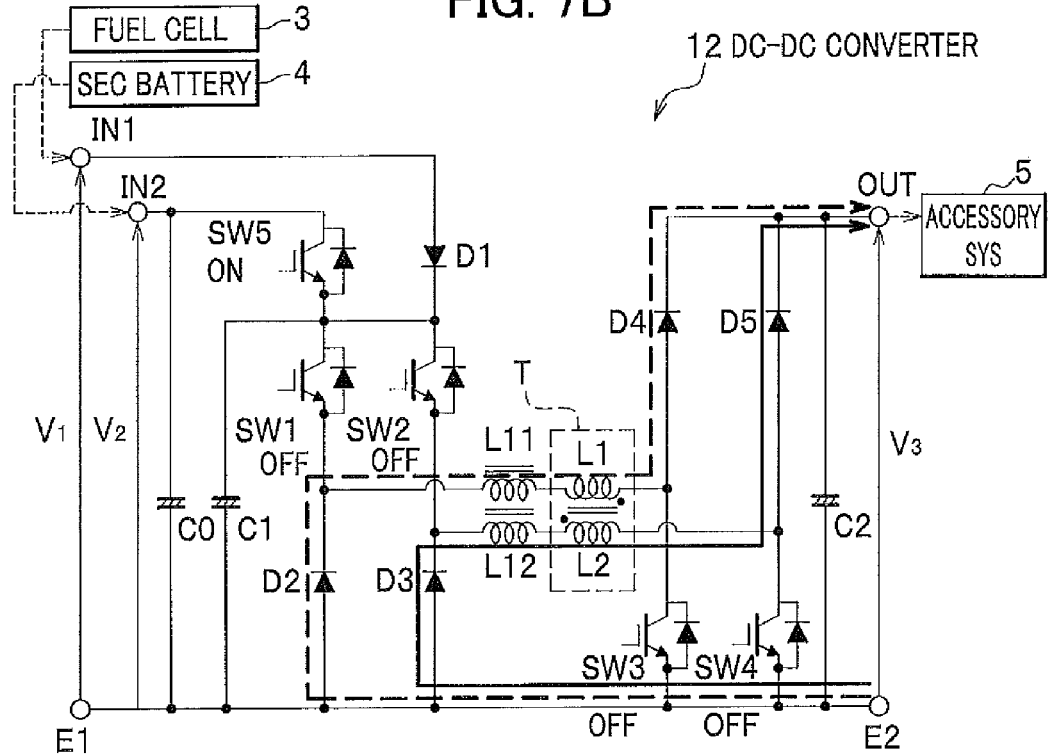
FIG. 7B is a diagram for explaining a bucking operation in the DC-DC converter of the first embodiment of the present invention corresponding to the gate signal shown in FIG. 3B, and shows an operation in a time interval from $t_4$ to $t_5$.

Accordingly, the operation during such a period from $t_4$ to $t_5$ is same as the operation during the period from $t_2$ to $t_3$ as shown in FIG. 7B, and a duplicated explanation will be omitted. Note that in FIG. 7B, the kind of arrow is shown so as to match the last period.

<4. Operation of Power Supplying System>

Regarding a relationship between an operational state of the fuel cell electric vehicle and power feeding, an explanation will be given of an operational state of the fuel cell electric vehicle in which the power supplying system 1 is built with reference to FIGS. 8 to 12 (and FIGS. 1 and 2 as needed) divided into 4-1. at the time of activation of fuel cell, 4-2. right after activation of fuel cell, 4-3. at the time of normal running of fuel cell electric vehicle, 4-4. at the time of accelerating running and maximum-output running of vehicle, and 4-5. at the time of generating regenerative power.

In the following explanation, the first voltage by the fuel cell 3 is called a "FC power-supply voltage", the fourth voltage output by the DC-DC converter 11 is called a "load feeding FC voltage", the second voltage by the secondary battery 4 is called a "battery voltage", and the third voltage for the accessory system 5 is called an "accessory-system voltage".

<4-1. At the Time of Startup of Fuel Cell>

Figure 8:
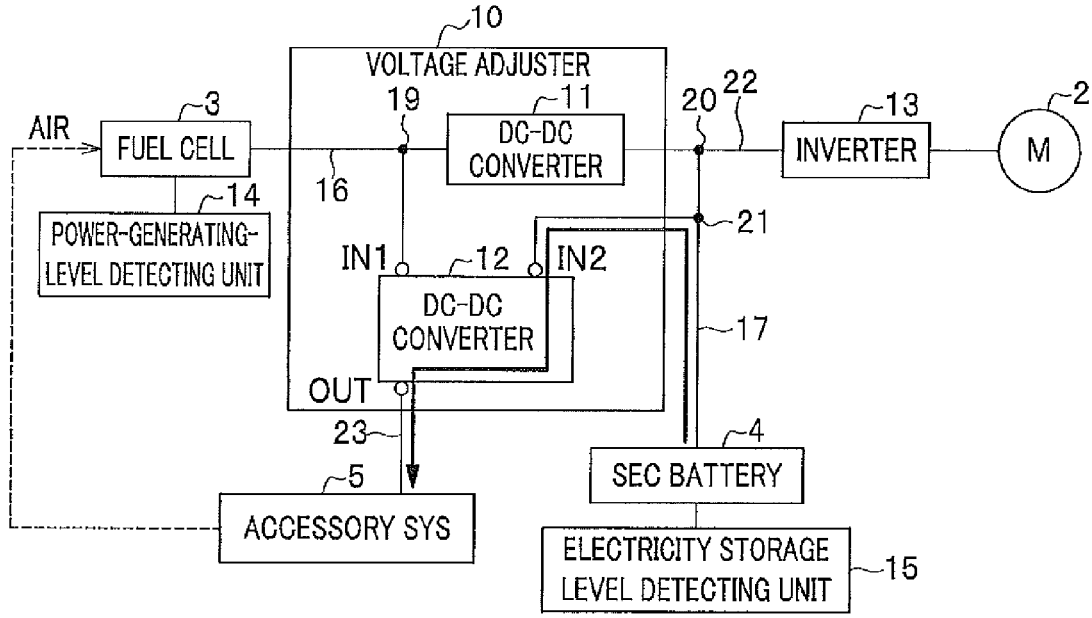
FIG. 8 is an explanatory diagram showing a flow of power by a secondary battery at the time of activating a fuel cell according to the present invention.

At the time of startup of the fuel cell 3, because the fuel cell 3 does not start power generation yet, it is necessary at first to operate the fuel-cell accessory by power from the secondary battery 4. Accordingly, as shown in FIG. 8, the DC-DC converter 12 is caused to buck the battery voltage (e.g., 400 to 600 V) to the accessory-system voltage (e.g., 300 V).

Accordingly, the controller 24 (see FIG. 1) supplies, to the DC-DC converter 12, a control signal for maintaining the backflow prevention switching device SW5 (see FIG. 2) of the DC-DC converter 12 in an ON state, and a gate signal for turning on/off the first and second switching devices SW1, SW2. At this time, in response to the control signal from the controller 24, the DC-DC converter 12 performs a bucking operation. More specifically, a current starts flowing through a path from "the secondary battery 4 to the second bus 17 to the junction 21 to the DC-DC converter 12 to the second feeding path 23 and to the accessory system 5".

Accordingly, in the accessory system 5, the air pump (air compressor) 6 (see FIG. 1) to which power is supplied from the secondary battery 4 compresses air and sends the compressed air to the fuel cell 3 to start up the fuel cell 3. At this time, because the DC-DC converter 12 is deactivated, no current flows back to the fuel cell 3.

<4-2. Right after Activation of Fuel Cell>

Right after the startup of the fuel cell 3, when the fuel cell 3 becomes to generate sufficient power, a system transitions to a state in which the fuel-cell accessory like the air pump 6 (see FIG. 1) is operated by power from the fuel cell 3. In this case, after the fuel cell 3 starts power generation, the power-generating-level detecting unit 14 detects an output voltage or the like by the fuel cell 3, and when it is determined that the voltage by the fuel cell 3 becomes ready for output, the controller 24 (see FIG. 1) outputs a control signal for turning off the backflow prevention switching device SW5 (see FIG. 2) of the DC-DC converter 12. At this time, outputting of gate signals for turning on/off the first and second switching devices SW1, SW2 (see FIG. 2) of the DC-DC converter 12 is terminated. Accordingly, power supply from the secondary battery 4 to the air pump 6 is terminated.

Figure 9:
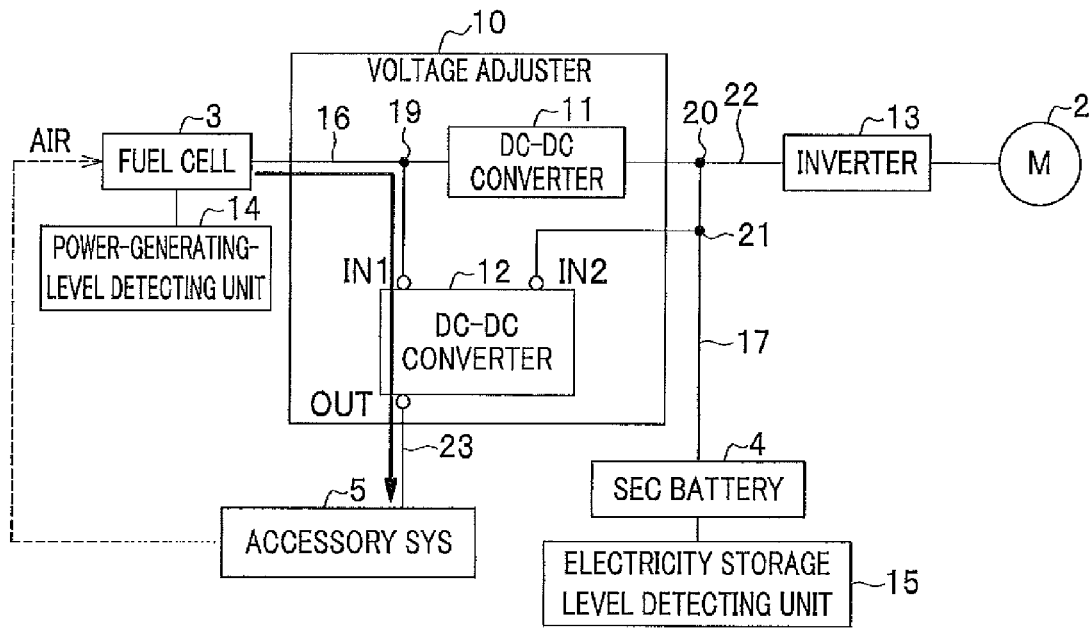
FIG. 9 is an explanatory diagram showing a flow of power by the fuel cell after activation of the fuel cell according to the present invention.

Next, as shown in FIG. 9, the DC-DC converter 12 is caused to boot the FC power-supply voltage (150 to 300 V) to the accessory-system voltage (300 V), and supplies the boosted voltage to the accessory system 5. In order to do so, the controller 24 (see FIG. 1) outputs, to the DC-DC converter 12, a control signal for maintaining the backflow prevention switching device SW5 (see FIG. 2) of the DC-DC converter 12 in an OFF state, and gate signals for turning on/off the third and fourth switching devices SW3, SW4 (see FIG. 2). At this time, in response to the control signal from the controller 24, the DC-DC converter 12 performs a boosting operation. More specifically, a current starts flowing through a path from "the fuel cell 3 to the first bus 16 to the junction 19 to the DC-DC converter 12 to the second feeding path 23 and to the accessory system 5". Note that in a condition shown in FIG. 9, the DC-DC converter 12 is deactivated.

When the controller 24 determines that an output sufficient to drive the motor 2 for running the vehicle can be acquired from the fuel cell 3 and power generation is stable, the controller 24 drives the fuel-cell accessory such as the air pump 6 with power from the fuel cell 3 in order to suppress any power consumption of the non-illustrated low-voltage battery of the accessory system 5. Accordingly, the air pump 6 (see FIG. 1) to which power is supplied from the fuel cell 3 compresses air and sends the compressed air to the fuel cell 3. Note that before the determination by the controller 24 (see FIG. 1), the air pump 6 or the like is operated by power from non-illustrated low-voltage battery and from the DC-DC converter both in the accessory system 5.

Figure 11A:
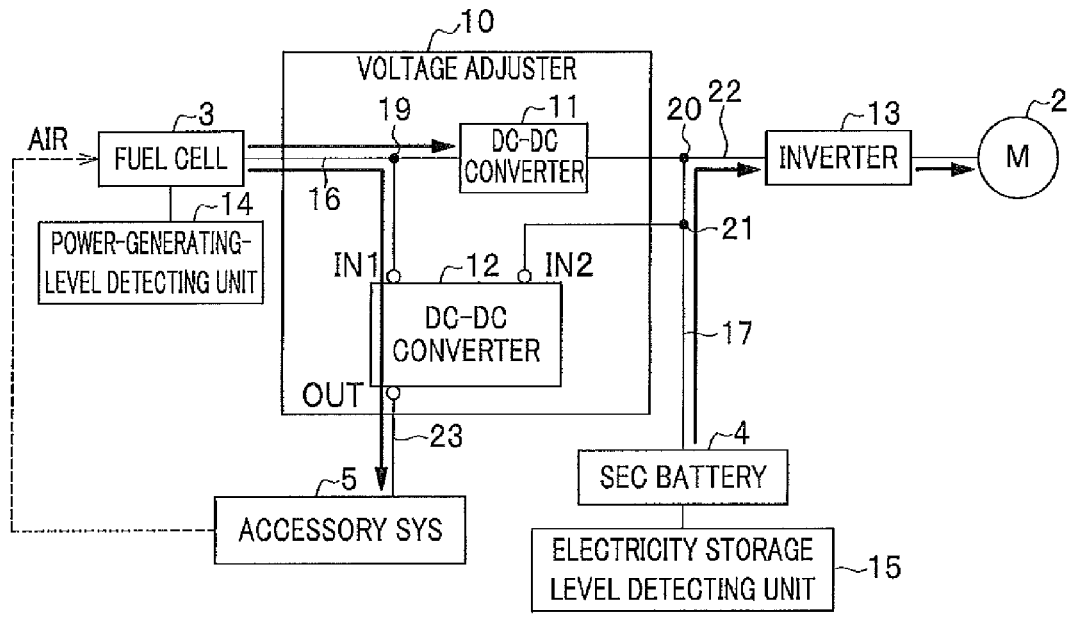
FIG. 11A is an explanatory diagram showing a flow of power at the time of acceleration according to the present invention and when the secondary battery is assisted.

Moreover, at the time of startup of the fuel cell 3 (when the power-generating level of the fuel cell 3 is insufficient) or when it is right after the activation of the fuel cell 3, if it is necessary to run the vehicle, power is also supplied to the motor 2 from the secondary battery 4 concurrently. More specifically, as shown in FIG. 11A, a current starts flowing through a path from "the secondary battery 4 to the second bus 17 to the junction 20 to the first feeding path 22 to the inverter 13 and to the motor 2". Accordingly, even if it is at the time of activation of the fuel cell 3 or even when it is right after the activation of the fuel cell 3, the fuel cell electric vehicle becomes able to run. A case in which the vehicle needs to run at the time of, for example, activation of the fuel cell 3 is a case in which a driver (a user) requests an output at the time of, for example, activation of the fuel cell 3. It is determined by the controller 24 that the driver requests an output when he/she steps on an acceleration pedal.

<4-3. At the Time of Normal Running by Fuel Cell Electric Vehicle>

After the fuel cell 3 is activated, in a normal running state, a system transitions its mode from a state shown in FIG. 9 to a state shown in FIG. 10. First, in the state shown in FIG. 9, when the controller 24 determines that the fuel cell 3 is capable of generating power necessary for running, power is supplied to the inverter 13 from the fuel cell 3 via the DC-DC converter 11, and the motor 2 is driven. More specifically, a current starts flowing through a path from "the fuel cell 3 to the first bus 16 to the DC-DC converter 11→the first feeding path 22 to the inverter 13 and to the motor 2". The DC-DC converter 11 boosts the FC power-supply voltage, and if a setting is made in such a way that the load feeding FC voltage becomes slightly higher than the battery voltage (e.g., 400 to 600 V), a current flowing from the fuel cell 3 to the motor 2 becomes large. This power-feeding mode is an FC feeding mode in which power is mainly supplied from the fuel cell 3.

At this time, when, for example, the electricity storage level detecting unit 15 detects that the electricity storage level by the secondary battery 4 is lower than a first predetermined level, the controller 24 (see FIG. 1) increases the boosting ratio of the DC-DC converter 11, and makes a setting in such a way that the load feeding FC voltage becomes further higher than the battery voltage (e.g., 400 to 600 V). Note that the first predetermined level is a electricity storage level corresponding to power necessary at the time of re-activation of the fuel cell 3.

Figure 10A:
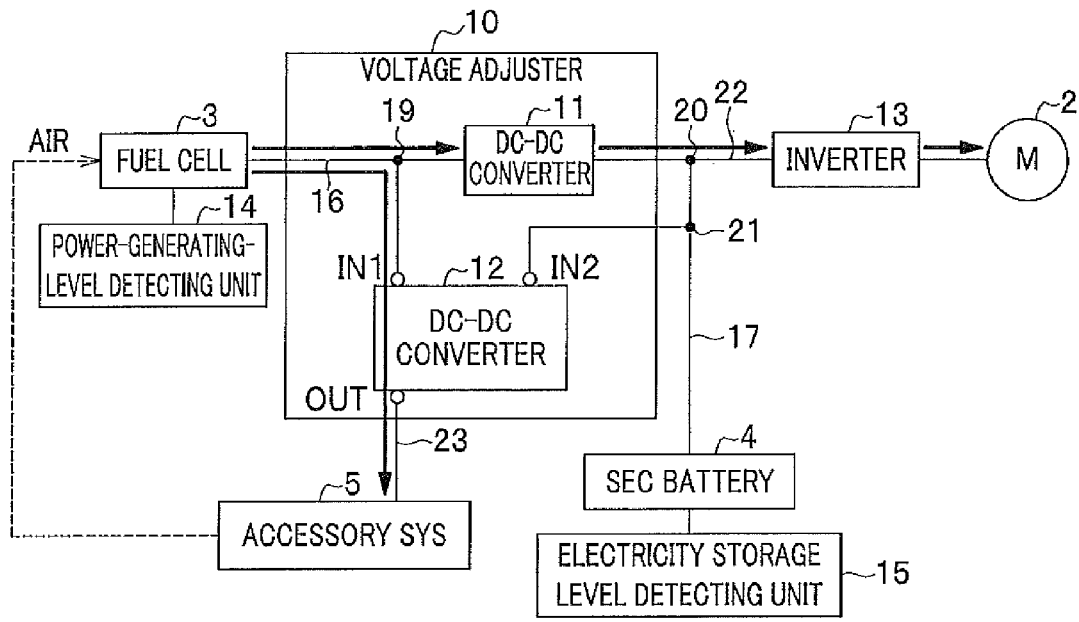
FIG. 10A is an explanatory diagram showing a flow of power at the time of running according to the present invention and when power is supplied to a motor from the fuel cell.
Figure 10B:
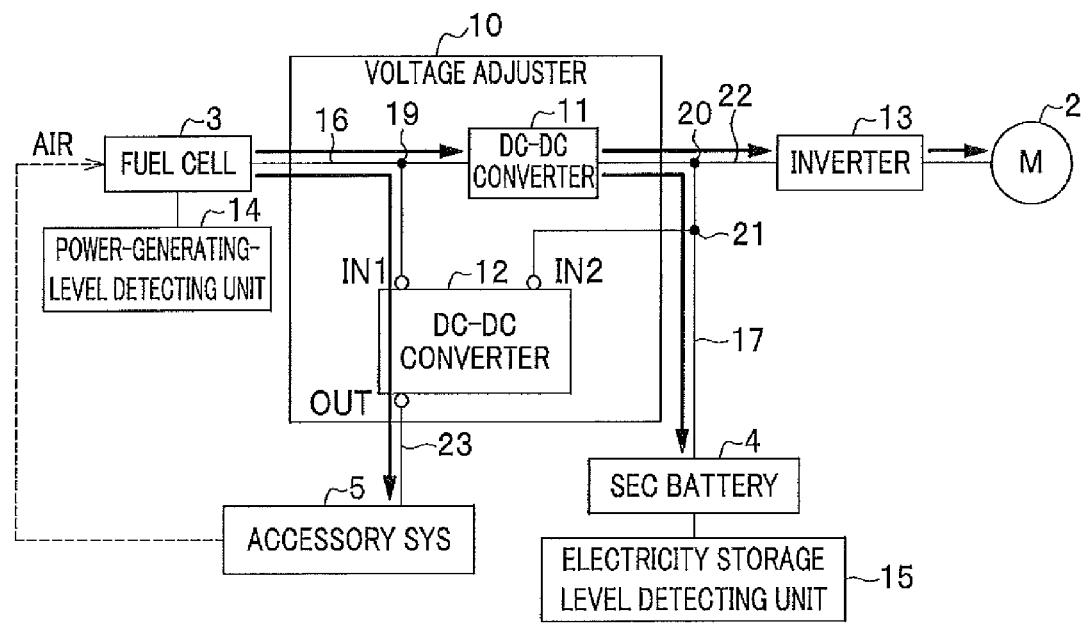
FIG. 10B is an explanatory diagram showing a flow of power at the time of running according to the present invention and when the secondary battery is charged in a parallel manner.

As explained above, when a setting is made in such a way that the load feeding FC voltage becomes further higher than the battery voltage, even when the motor 2 is being driven (the vehicle is running), as shown in FIG. 10B, the secondary battery 4 can be charged by power from the fuel cell 3. More specifically, a current flows through a path from "the fuel cell 3 to the first bus 16 to the DC-DC converter 11 to the junction 20 to the second bus 17 and to the secondary battery 4".

<4-4. At the Time of Accelerating Running and Maximum-Output Running of Fuel Cell Electric Vehicle>

Figure 11B:
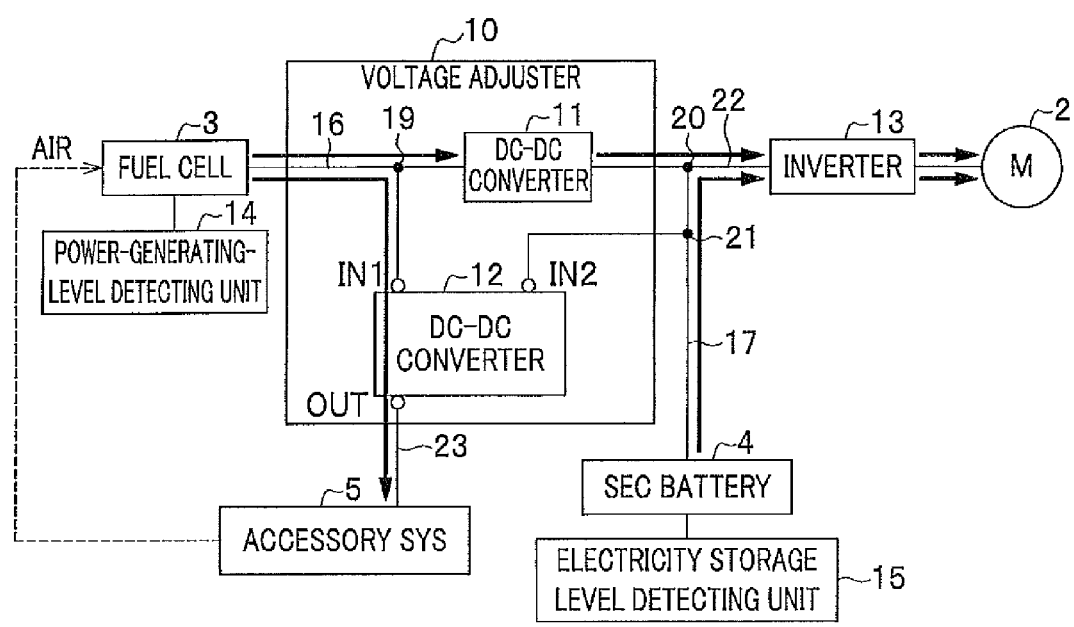
FIG. 11B is an explanatory diagram showing a flow of power at the time of acceleration according to the present invention and at the time of maximum output.

After the startup of the fuel cell 3, at the time of maximum-output running when it is necessary to accelerate, the system shifts its mode from a state shown in FIG. 10A to a state shown in FIG. 11B. First, in a state shown in FIG. 11A, the controller 24 (see FIG. 1) increases the boosting ratio of the DC-DC converter 11 and makes a setting in such a way that the load feeding FC voltage becomes equal to the battery voltage (e.g., 400 to 600 V). In this case, because a current flowing from the secondary battery 4 into the motor 2 and a current flowing from the fuel cell 3 into the motor 2 are balanced with each other, as shown in FIG. 11B, currents flow into the motor 2 from both fuel cell 3 and secondary battery 4. Accordingly, when rapid acceleration is required and power generation by the fuel cell 3 alone becomes insufficient, power by what corresponds to a shortage can be supplied from the secondary battery 4. Moreover, at the time of maximum-output running equal to maximum power generation by the fuel cell 3 or larger, maximum power acquired by adding both power of the fuel cell 3 and that of the secondary battery 4 together can be output.

<4-5. At Time of Generating Regenerative Power>

After the startup of the fuel cell 3, at the time of regeneration, when the revolution of the motor 2 that is a load is subjected to a deceleration control (regenerative braking operation) and the voltage at the load side increases, the voltage at the load side is bucked to return energy to the input side. When regenerative power is relatively large or when the secondary battery 4 is fully charged, the controller 24 (see FIG. 1) controls the inverter 13 to make a regenerative voltage equal to the battery voltage (e.g., 400 to 600 V), and outputs a control signal for turning on the backflow prevention switching device SW5 (see FIG. 2) of the DC-DC converter 12. Accordingly, the regenerative voltage becomes equal to the battery voltage, and the secondary battery 4 stops charging/discharging. Moreover, because the DC-DC converter 12 performs a bucking operation, regenerative power is supplied to the accessory system 5.

When, for example, the electricity storage level detecting unit 15 detects that the electricity storage level of the secondary battery 4 is higher than a second predetermined level, the controller 24 can determine that the secondary battery 4 is fully charged. The second predetermined level is a electricity storage level when there is no margin for taking in the regenerative power.

Figure 12:
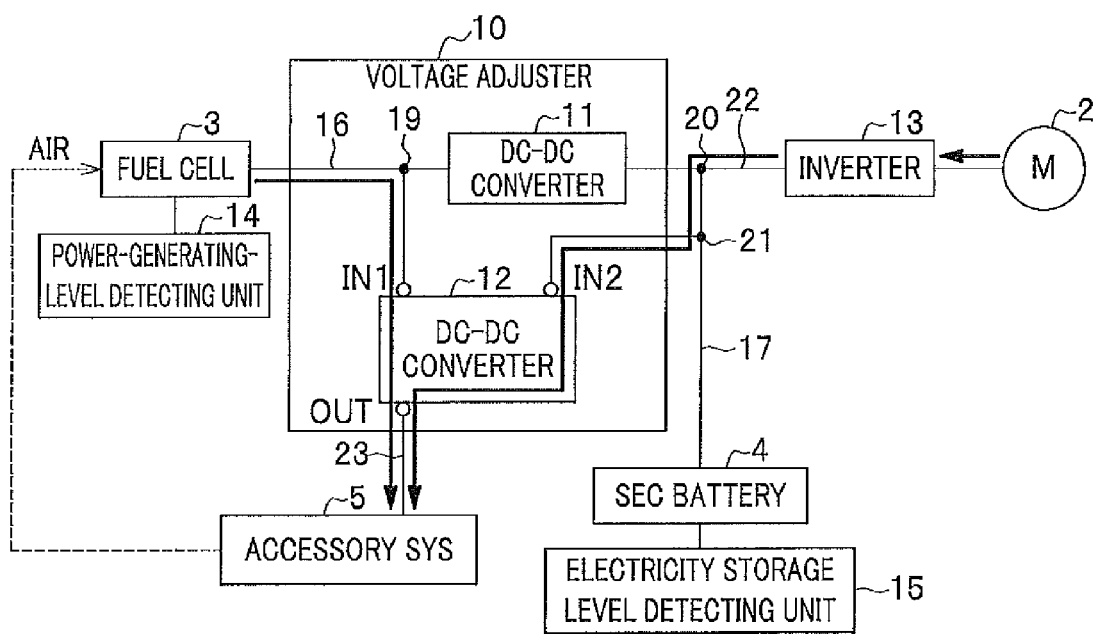
FIG. 12 is an explanatory diagram showing a flow of power when an accessory system is subjected to regeneration at the time of regeneration according to the present invention.

At the time of regeneration, in accordance with the foregoing output signal by the controller 24 (see FIG. 1), more specifically, as shown in FIG. 12, a current starts flowing through a path from "the motor 2 to the inverter 13 to the first feeding path 22 to the junction 20 to the junction 21 to the DC-DC converter 12 to the second feeding path 23 to the accessory system 5". Accordingly, in the accessory system 5, for example, the air pump 6 (see FIG. 1) consumes the regenerative power. Note that when power supplied to the accessory system 5 at the time of regeneration is excessive, it is possible to cope with such excessive power through an intentional inefficient operation such that the controller 24 controls the air pump 6 to operate in an operational range where the efficiency is poor in order to promote power consumption.

At the time of regeneration, the DC-DC converter 11 is deactivated. This allows the DC-DC converter 11 to suppress any backflow of a current, and no regenerative power flows back to the fuel cell 3. Moreover, it is possible to easily determine whether or not regenerative power is generated by utilizing a brake signal. For example, when a brake pedal is stepped on or when the driver releases the acceleration pedal, the controller 24 can determine that it is in a regeneration mode.

Moreover, when the regenerative power is relatively little or when the secondary battery 4 is not fully charged, power from the motor 4 may be subjected to regeneration into the secondary battery 4. When power from the motor 2 is subjected to regeneration into the secondary battery 4, the controller 24 controls the inverter 13 to cause the regenerative voltage to be higher than the battery voltage (e.g., 400 to 600 V), and the secondary battery 4 is charged. More specifically, a current flows through a path from "the motor 2 to the inverter 13 to the first feeding path 22 to the junction 20 to the second bus 17 and to the secondary battery 4".

<5. Illustrative Structure of Transformer in DC-DC Converter of First Embodiment>

An explanation will now be given of an illustrative structure of the transformer T in the DC-DC converter 12 of the first embodiment divided into 5-1. first specific example of transformer and 5-2. second specific example of transformer.

<5-1. First Specific Example of Transformer>

Figure 13A:
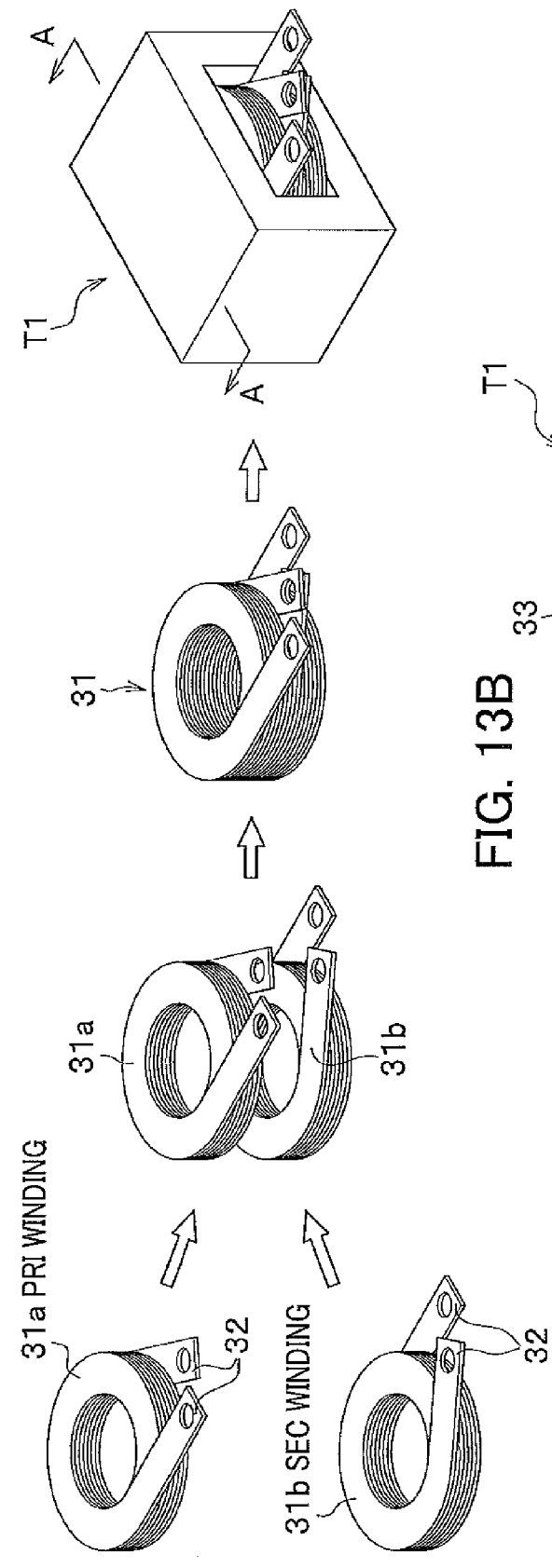
FIG. 13A is a diagram showing a structure of a first specific example of a transformer in the DC-DC converter of the first embodiment of the present invention, and shows an assembling process.

Next, an explanation will be given of the first specific example (transformer T1) of the transformer T (see FIG. 2) which is a magnetic part for the DC-DC converter 12 of the first embodiment with reference to FIGS. 13A and 13B.

The transformer T1 (T) has a core 30 and a separated winding 31 wound therearound. As shown in FIG. 13A, the separated winding 31 is assembled by stacking a winding 31a which will be the primary winding L1 on a winding 31b which will be the secondary winding L2. Note that the windings 31a, 31b each have terminals 32.

Figure 13B:
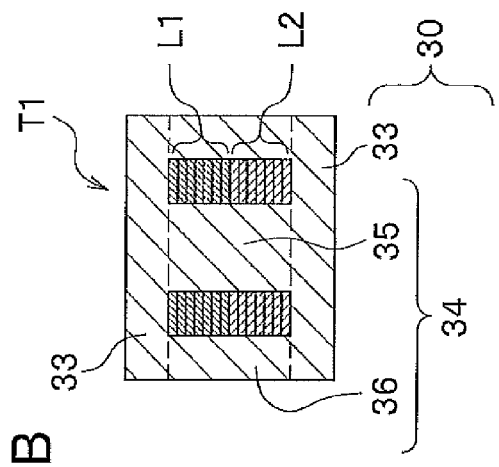
FIG. 13B is a diagram showing the structure of the first specific example of the transformer in the DC-DC converter of the first embodiment of the present invention, and shows a cross-sectional shape.

As shown in FIG. 13B, the core 30 has basal parts 33 provided on and below the separated winding 31, and a magnetic pole part 34 provided between the two basal parts 33. FIG. 13B is a vertical cross-sectional view of the transformer T1 (T) along a line A-A in FIG. 13A.

The magnetic leg part 34 forms a closed magnetic path by magnetic flux generated by the primary winding L1 and by the secondary winding L2. The basal part 33 fixes the magnetic leg part 34, and forms the closed magnetic path together with the magnetic leg part 34. The magnetic leg part 34 includes a middle leg part 35 where the primary winding L1 and the secondary winding L2 are wound, and external leg parts 36 arranged side by side with the middle leg part 35.

Because the transformer T1 has the primary winding L1 and the secondary winding L2 both stacked individually and orderly, the packaging density can be improved without generated magnetic flux dispersing. Accordingly, by using such a transformer T1 in the DC-DC converter 12, the transformer T configuring a magnetic part can be miniaturized and light-weighted.

<5-2. Second Specific Example of Transformer>

Next, an explanation will be given of a second specific example (transformer T2) of the transformer T (see FIG. 2) that is a magnetic part of the DC-DC converter 12 of the first embodiment with reference to FIGS. 14A and 14B.

The transformer T in the DC-DC converter 12 has the primary winding L1 and the secondary winding L2 with the same number of turns. Accordingly, a transformer T2 is formed by winding a bifilar winding 41 around a core 40. The bifilar winding 41 is assembled by, as shown in FIG. 14A, alternately stacking a winding 41a which will be the primary winding L1 and a winding 41b which will be the secondary winding L2. That is, the bifilar winding 41 has a structure in which the primary winding and the secondary winding are wound simultaneously for each turn. Note that the windings 41a, 41b each have terminals 42.

As shown in FIG. 14B, the core 40 has basal parts 41 provided on and below the bifilar winding 41, and a magnetic leg part 44 provided between the two basal part 43. FIG. 14B is a vertical cross-sectional view of the transformer T2 in FIG. 14A along a line B-B.

The magnetic leg part 44 forms a closed magnetic path by magnetic flux generated by the primary winding L1 and the secondary winding L2. The basal parts 43 fix the magnetic leg part 44, and form the closed magnetic path together with the magnetic leg part 44. The magnetic leg part 44 has a middle leg part 45 around which the primary winding L1 and the secondary winding L2 are wound and external leg parts 46 formed side by side with the middle leg part 45.

Because the transformer T2 has the primary winding L1 and the secondary winding L2 alternately stacked together in an orderly manner, DC residual flux can be further reduced, thereby making it possible to miniaturize the core and improving the packaging density. Accordingly, using such a transformer T2 in the DC-DC converter 12 as the transformer T, makes a magnetic part miniaturized and light-weighted.

<6. Structure of DC-DC Converter of Second Embodiment>

A DC-DC converter 12B according to the second embodiment of the present invention differs from the DC-DC converter 12 shown in FIG. 2 that a transformer T3 also serve as the inductors L11, L12 as shown in FIG. 15. The other structural elements are same as those in FIG. 2, so that duplicated explanation will be skipped below. Note that the equivalent circuit of the DC-DC converter 12B is same as the equivalent circuit of the DC-DC converter 12, but the structure of the transformer T3 clearly differs from the structure of the transformer T (T1, T2). An explanation will now be given of the structure of the transformer T3 in detail.

<7. Illustrative Structure of Transformer in DC-DC Converter of Second Embodiment>

Figure 16A:
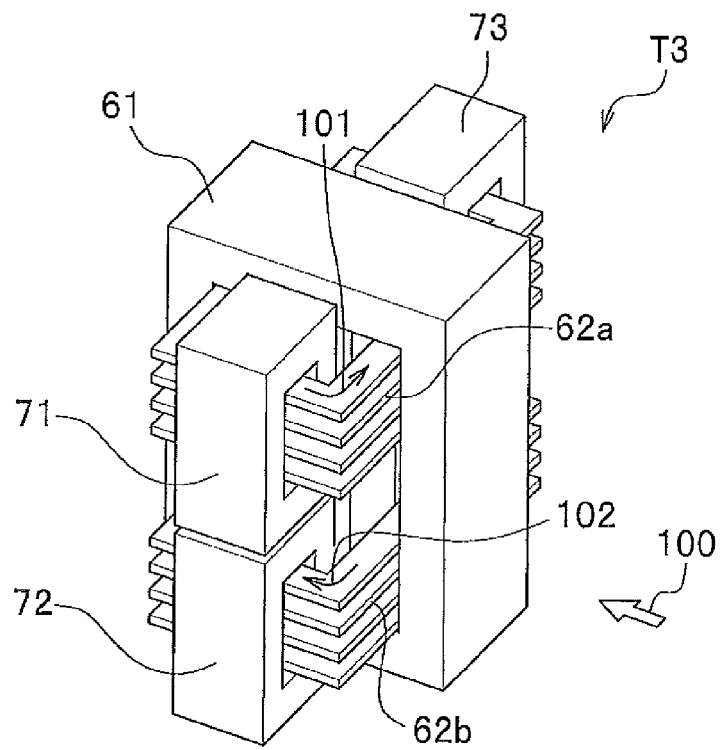
FIG. 16A is a diagram showing a structure of a specific example of a transformer in the DC-DC converter of the second embodiment of the present invention, and is an external view.
Figure 16B:
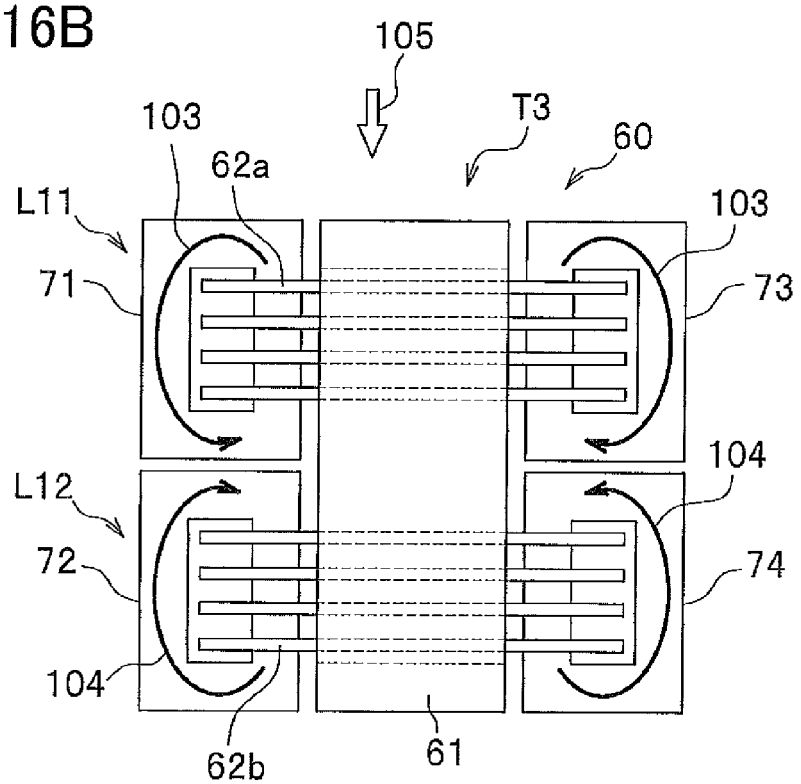
FIG. 16B is a diagram showing the structure of the specific example of the transformer in the DC-DC converter of the second embodiment of the present invention, and is a front view.
Figure 17A:
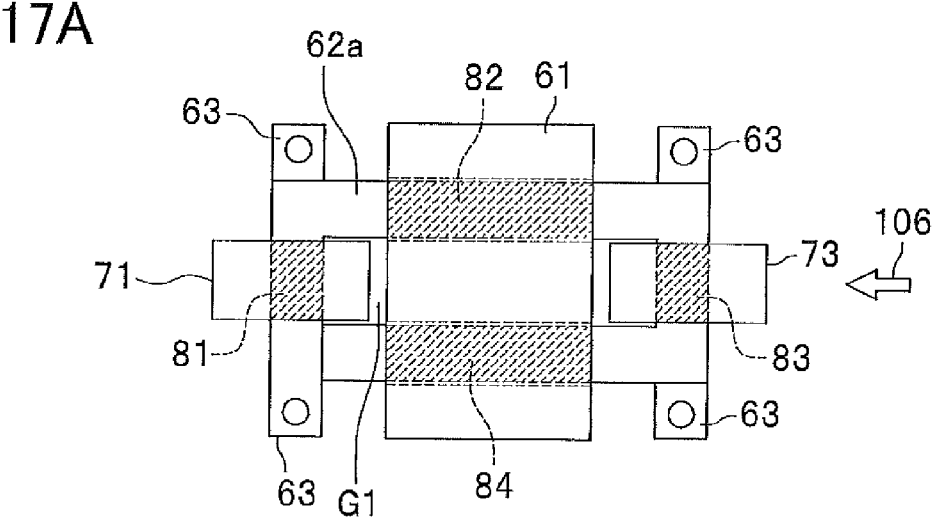
FIG. 17A is a diagram showing the structure of the specific example of the transformer in the DC-DC converter of the second embodiment of the present invention, and is a top view.
Figure 17B:
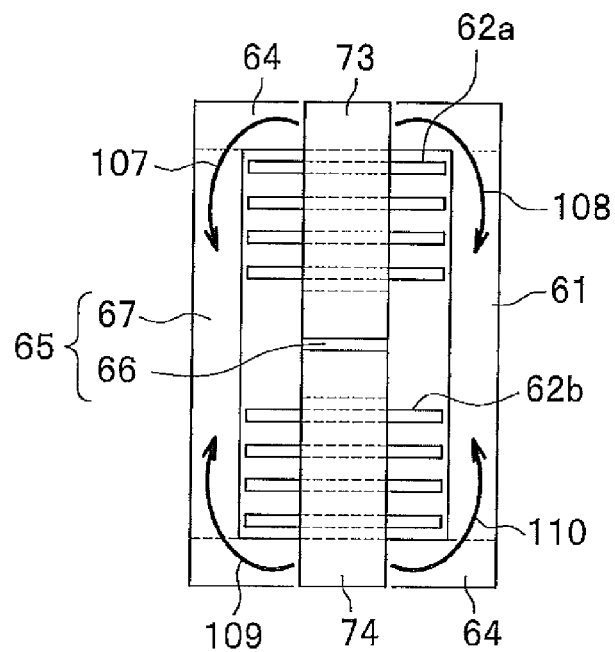
FIG. 17B is a diagram showing the structure of the specific example of the transformer in the DC-DC converter of the second embodiment of the present invention, and is a right side view.

Next, an explanation will be given of a specific example of the transformer T3 that is a magnetic part of the DC-DC converter 12B of the second embodiment with reference to FIGS. 16A, 16B and 17A, 17B. FIG. 16A is a perspective view showing the transformer T3, and FIG. 16B shows the transformer T3 as viewed in a direction (front) indicated by an arrow 100 in FIG. 16A. Moreover, FIG. 17A shows the transformer T3 as viewed in a direction (up) indicated by an arrow 105 in FIG. 16B, and FIG. 17B shows the transformer T3 as viewed in a direction (right) indicated by an arrow 106 in FIG. 17A.

The transformer T3 is a composite transformer having a function as a transformer and a function as an inductor. The following explanation will be given of 7-1. structure of transformer T3, 7-2. function as inductor, and 7-3. function as transformer, respectively.

<7-1. Structure of Transformer T3>

As shown in FIGS. 16A and 16B, the transformer T3 equivalently is formed with a transformer 60 and inductors L11, L12. The transformer 60 has a winding 62a that will be the primary winding L1 and a winding 62b that will be the secondary winding L2 separately wound around a transformer core 61.

The primary winding L1 and the secondary winding L2 are magnetically coupled together via the transformer core 61, and connected in a reverse winding manner at a substantially same turn ratio. In the present embodiment, the winding 62a is wound in a direction in which a right-hand screw goes forward from the bottom to the top in FIG. 16A, and the winding 62b is wound in a direction in which a right-hand screw goes forward from the top to the bottom in FIG. 16A. A current flows through the winding 62a in a direction of an arrow denoted by a reference numeral 101, while a current flows through the winding 62b in a direction of an arrow denoted by a reference numeral 102.

The inductor L11 comprises a first core 71 for the inductor, a third core 73 for the inductor, and the winding 62a wound around the first core 71 for the inductor and around the third core 73 for the inductor. Likewise, the inductor L12 comprises a second core 72 for the inductor, an fourth core 74 for the inductor, and the winding 62b wound around the second core 72 for the inductor and around the fourth core 74 for the inductor.

The winding 62a extends outwardly of the transformer core 61, and the extending part of the winding 62a is wound around the first core 71 for the inductor and around the third core 73 for the inductor (hereinafter, simply called inductor cores 71, 73). Likewise, the winding 62b extends outwardly of the transformer core 61, and the extending part of the winding 62b is wound around the second core 72 for the inductor and around the fourth core 74 for the inductor (hereinafter, simply called inductor cores 72, 74). The inductor cores 71, 73 are arranged at opposite locations to the inductor cores 72, 74 across the transformer core 61. Norte that the inductor L11 may be formed by either of the inductor core 71 or the inductor core 73, while the inductor L12 may be formed by either of the inductor core 72 or the inductor core 74. As shown in FIG. 17A, the windings 62a, 62b each have terminals 63 at an input side and an output side. A gap G1 is formed between the inductor cores 71, 72, 73, and 74, and, the transformer core 61 in order to separate adjoining magnetic fluxes. As shown in FIG. 16B, a gap is likewise formed between the inductor cores 71, 72 and the inductor cores 73, 74 in order to separate magnetic fluxes up and down As shown in FIG. 17B, the transformer core 61 has basal parts 64 provided on and below the windings 62a, 62b, and a magnetic leg part 65 provided between the two basal parts 64. The magnetic leg part 65 forms a closed magnetic path by magnetic flux generated by the windings 62a, 62b. The basal parts 64 fix the magnetic leg part 65, and form the closed magnetic path together with the magnetic leg part 65. The magnetic leg part 65 has a middle leg part 66 around which the windings 62a, 62b are wound, and external leg parts 67 formed side by side with the middle leg part 66.

As explained above, the transformer T3 has a basic structure as the transformer 60 comprising the transformer core 61 and the windings 62a, 62b which extend outwardly of the transformer core 61. The inductor cores 71, 72, 73, and 74 are additionally provided by utilizing the extending portions of the coil to form the two inductors L11, L12.

<7-2. Function as Inductor>

As shown in FIG. 16A, as a current flows through the winding 62a in the direction of the arrow denoted by the reference numeral 101, magnetic flux is generated at the first core 71 for the inductor in a direction of an arrow denoted by a reference numeral 103 as shown in FIG. 16B. Moreover, at another timing, as shown in FIG. 16A, as a current flows through the winding 62b in the direction of the arrow denoted by the reference numeral 102, magnetic flux is generated at the second core 72 for the inductor in a direction of an arrow denoted by the reference numeral 104 as shown in FIG. 16B.

That is, the inductor cores 71, 73 generate magnetic energy as a current flows through the winding 62a, and, the winding 62a and the inductor cores 71, 73 form a part that functions as the inductor L11. Moreover, the inductor cores 72, 74 generate magnetic energy as a current flows through the winding 62b, and, the winding 62b and the inductor cores 72, 74 form a part that functions as the inductor L12. A hatched area 81 of the windings 62a, 62b shown in FIG. 17A mainly contributes to generation of magnetic flux at the inductor cores 71, 72 as a current flows through each winding 62a, 62b. Likewise, a hatched area 83 shown in FIG. 17A mainly contributes to generation of magnetic flux at the inductor cores 73, 74 as a current flows through each winding 62a, 62b.

<7-3. Function as Transformer>

As shown in FIG. 16A, as a current flows through the winding 62a in the direction of the arrow denoted by the reference numeral 101, magnetic flux is generated at the transformer core 61 in respective directions of arrows denoted by reference numerals 107, 108, shown in FIG. 17B. Moreover, at another timing, as shown in FIG. 16A, as a current flows through the winding 62b in the direction of the arrow denoted by the reference numeral 102, magnetic flux is generated at the transformer core 61 in respective directions of arrows denoted by reference numerals 109, 110 as shown in FIG. 17B.

As magnetic flux is generated at the transformer core 61, a magnetic mutual action occurs between the winding 62a and the winding 62b, which brings about a transformation action. Accordingly, the two windings 62a, 62b and the transformer core 61 form a part that functions as the transformer 60. Hatched areas 82, 84 in the windings 62a, 62b shown in FIG. 17A mainly contribute to generation of magnetic flux as a current flows through each winding 62a, 62b.

As explained above, the transformer T3 has the windings 62a, 62b of the transformer 60 commonly used as the coils for the inductors L11, L12, and the transformer 60 and the inductors L11, L12 are realized with an integrated structure by merely additionally providing the inductor cores 71, 72, 73, and 74 to the windings 62a, 62b of the transformer 60. By using such a transformer T3 in the DC-DC converter 12, the transformer T3 which functions not only as the inductors L11, L12 but also as the transformer 60 can be miniaturized and light-weighted.

As explained above, according to the power supplying system 1 of the embodiments of the present invention, the DC-DC converter 12 connects main system which supplies power to the motor 2 (the load) from the fuel cell 3 and from the secondary battery 4 and a sub system which supplies power to the accessory system 5 together, general-purpose electrical components can be used as the air pump 6 and the air conditioner 8 in the accessory system 5 compatible with the voltage specification in accordance with the voltage of the fuel cell 3 and that of the secondary battery 4. This enables cost reduction of the power supplying system 1.

Moreover, because the DC-DC converter 12 of the embodiments of the present invention performs an operation of boosting an input voltage at the first-voltage-side port and an operation of bucking an input voltage at the second-voltage-side port at different timings, even if two input voltages are in different voltage ranges, it is possible for the DC-DC converter 12 to stably output a voltage at a constant voltage value with respect to both input voltages by adjusting the boosting ratio and the bucking ratio. Accordingly, as the DC-DC converter 12 is applied to power supplying systems like the power supplying system 1 that supplies power to the motor 2 from the fuel cell 3 and also from the secondary battery 4 which are two DC power sources, the power supplying system can be operated stably.

Furthermore, when applied to the power supplying system 1, the DC-DC converter 12 of the embodiments of the present invention performs switching for bucking a battery voltage from the secondary battery 4 at the time of startup of the fuel cell 3, terminates a bucking operation when sufficient power generating level is secured after the startup of the fuel cell 3, and boosts a FC power-supply voltage of the fuel cell 3. Accordingly, in the power supplying system 1, two DC-DC converters which comprise a bucking-exclusive device and of a boosting-exclusive device and which substitutes the boosting/bucking operation of the DC-DC converter 12 may be used at a connection location of the DC-DC converter 12. In this fashion, because when two DC-DC converters are integrated together and applied to the power supplying system 1, the two DC-DC converters integrated together do not operate simultaneously, attached components, such as the smoothing capacitor C2 (see FIG. 2), a heat sink, a voltage sensor, and a current sensor, can be sheared. However, the two DC-DC converters individually need magnetic parts, such as the inductors L11, L12 and the transformer T (or the transformer T3). In contrast, the DC-DC converter 12 of the embodiments of the present invention has two functions as a bucking-exclusive device and as a boosting-exclusive device, and can reduce the number of magnetic parts in comparison with the foregoing two DC-DC converters. That is, the system cost can be reduced as the DC-DC converter 12 is used.

The explanation was given of the preferred embodiments of the DC-DC converter of the present invention and the power supplying system equipped with same, but the present invention is not limited to the foregoing embodiments. For example, the explanation was given of a case in which the third voltage $V_3$ for the accessory system 5 is equal to the maximum value $V_1(\max)$ of the first voltage by the fuel cell 3 or higher, and is equal to the maximum value $V_2(\min)$ of the second voltage by the secondary battery 4 or smaller in the power supplying system 1 of the foregoing embodiments. However, the magnitude relation among the first, second, and third voltages $V_1$, $V_2$, and $V_3$ is not limited to the foregoing case. For example, it is appropriate if only a condition in which the minimum value $V_2(\min)$ of the second voltage by the secondary battery 4 is larger than the maximum value $V_1(\max)$ of the first voltage by the fuel cell 3 and the third voltage $V_3$ for the accessory system 5 is satisfied. Moreover, it is appropriate if only a condition in which the maximum value $V_1(\max)$ of the first voltage by the fuel cell 3 is smaller than the minimum value $V_2(\min)$ of the second voltage by the secondary battery 4 is satisfied.

The explanation was given of the best mode in which the power supplying system 1 of the foregoing embodiments has the power-generating-level detecting unit 14 and the electricity storage level detecting unit 15, but may employ a structure of having only the power-generating-level detecting unit 14 or a structure without both units.

Moreover, the power supplying system 1 of the foregoing embodiments supplies power to the motor 2 that is a load through a transform by the inverter 13, but power may be supplied to the load without the inverter 13 intervening. Moreover, the load is not limited to the motor, and may be, for example, a generator.

The power supplying system 1 of the foregoing embodiments is built in the fuel cell electric vehicle, but a moving object in which the power supplying system of the present invention is built is not limited to an onshore moving object, and may be, for example, a sea-based or in-water moving object. Furthermore, it is not a requisition that the power supplying system of the present invention is built in a moving object, and the present invention can be applied to various power supplying systems using a fuel cell like a household fuel cell system disposed in a fixed manner.

Furthermore, because the DC-DC converter 12 of the foregoing embodiments can stably output a voltage with a constant voltage value with respect to both two input voltages if the two voltages input at different timings are within different voltage ranges. Accordingly, the present invention can be applied to a system which performs power conversion with two inputs and one output and which is other than a system that supplies power from DC power sources comprising a fuel cell and a secondary battery.

What is claimed is:

1. A DC-DC converter comprising:
  a first-voltage-side port and a second-voltage-side port both of which are input ports, respectively;
  a third-voltage-side port which is an output port;
  a reference-voltage terminal common for inputting and outputting;
  first to fourth switching devices;
  a transformer including a core and a primary winding and a secondary winding both wound around the core:
  a backflow prevention diode having an anode connected to the first-voltage-side port; and
  a backflow prevention switching device having one end connected to the second-voltage-side port;
  the first switching device having one end connected to another end of the backflow prevention switching device, wherein the second switching device has one end connected to a cathode of the backflow prevention diode;

the primary winding has one end connected to another end of the first switching device;

the secondary winding has one end connected to another end of the second switching device;

a first diode has a cathode connected to another end of the first switching device and has an anode connected to the reference-voltage terminal;

a second diode has a cathode connected to another end of the second switching device and having an anode connected to the reference-voltage terminal;

a third diode has an anode connected to another end of the primary winding and having a cathode connected to the third-voltage-side port;

a fourth diode has an anode connected to another end of the secondary winding and having a cathode connected to the third-voltage-side port;

the third switching device has one end connected to another end of the primary winding and having another end connected to the reference-voltage terminal; and the fourth switching device has one end connected to another end of the secondary winding and has another end connected to the reference-voltage terminal.

2. The DC-DC converter according to claim 1, further comprising a controller configured to supply an ON-OFF control signal to the backflow prevention switching device to provide switching between flowing of a current from the second-voltage-side port to the third-voltage-side port and a cutoff of the current by controlling an ON-OFF operation of the backflow prevention switching device.

3. The DC-DC converter according to claim 1, further comprising a controller configured to supply an OFF control signal to the backflow prevention switching device, turn the first and second switching devices on while the backflow prevention switching device is in an OFF state, and alternately control respective ON-OFF operations of the third and fourth switching devices to perform a boosting operation from the first-voltage-side port to the third-voltage-side port.

4. The DC-DC converter according to claim 1, further comprising a controller configured to supply an ON control signal to the backflow prevention switching device from a controller, turn the third and fourth switching devices off while the backflow prevention switching device is in an ON state, and alternately control respective ON-OFF operations of the first and second switching devices to perform a bucking operation from the second-voltage-side port to the third-voltage-side port.

5. The DC-DC converter according to claim 1, wherein the transformer comprises a magnetic field canceling transformer, the primary winding and the secondary winding are magnetically coupled together via the core, and connected to the first and second switching devices to have an opposite induced current direction at a substantially same turn ratio, the core includes:
a magnetic leg part around which the primary winding and the secondary winding are wound, and forms a closed magnetic path by magnetic flux generated by the primary and secondary windings; and
a basal part which fixes the magnetic leg part and which forms the closed magnetic path together with the magnetic leg part, the magnetic leg part includes:
a middle leg part around which the primary winding and the secondary winding are wound; and
an external leg part formed side by side with the middle leg part.

6. The DC-DC converter according to claim 5, further comprising:
a first inductor provided between the first switching device and the primary winding; and
a second inductor provided between the second switching device and the secondary winding.

7. The DC-DC converter according to claim 1, wherein the transformer is a magnetic field canceling transformer, the primary winding and the secondary winding are magnetically coupled together via the core, and connected to the first and second switching devices to have an opposite induced current direction at a substantially same turn ratio, the core includes:
a magnetic leg part where the primary winding and the secondary winding are wound so as to be stacked together, the magnetic leg part forming a closed magnetic path by magnetic flux generated by the primary and secondary windings; and
a basal part which fixes the magnetic leg part and which forms the closed magnetic path together with the magnetic leg part, the magnetic leg part includes:
a middle leg part around which the primary winding and the secondary winding are wound; and
an external leg part formed side by side with the middle leg part.

8. The DC-DC converter according to claim 1, wherein the transformer is a magnetic field canceling composite transformer including an inductor and a transformer, the primary winding and the secondary winding are magnetically coupled together via a transformer core, and connected to the first and second switching devices to have an opposite induced current direction at a substantially same turn ratio, the transformer core includes:
a magnetic leg part around which the primary winding and the secondary winding are wound, and which forms a closed magnetic path by magnetic flux generated by the primary and secondary windings; and
a basal part which fixes the magnetic leg part and which forms the closed magnetic path together with the magnetic leg part, the magnetic leg part includes:
a middle leg part around which the primary winding and the secondary winding are wound; and
an external leg part formed side by side with the middle leg part.

the primary winding extends outwardly of the transformer core, and an extending part of the primary winding is wound around an inductor first core, and the secondary winding extends outwardly of the transformer core, and an extending part of the secondary winding is wound around an inductor second core.

9. The DC-DC converter according to claim 1, wherein the backflow prevention switching device comprises an Insulated Gate Bipolar Transistor with a flywheel diode.

10. The DC-DC converter according to claim 1, wherein the first to fourth switching devices each comprise an Insulated Gate Bipolar Transistor with a flywheel diode.

11. The DC-DC converter according to claim 1, wherein the backflow prevention switching device comprises a Metal Oxide Semiconductor Field Effect Transistor.

12. The DC-DC converter according to claim 1, wherein the first to fourth switching devices each comprises a Metal Oxide Semiconductor Field Effect Transistor.

13. A power supplying system comprising: the DC-DC converter according to claim 1, further comprising:
first and second feeding paths;
a first DC power source comprising a fuel cell configured to output a first voltage;
a second DC power source comprising a secondary battery configured to output a second voltage;
an accessory system which is connected to the second feeding path supplying power from the fuel cell and from the secondary battery in a parallel, and which includes at least a fuel-cell accessory operated by a third voltage;
a first power converter which is connected between the fuel cell and the first feeding path to a load, and which boosts the first voltage of the fuel cell equal to one times or greater to convert the first voltage into a fourth voltage, the first feeding path supplying to the load the fourth voltage from the first power converter and the second voltage outputted by the secondary battery in parallel, wherein
the first-voltage-side port is connected to the fuel cell;
the second-voltage-side port is connected to the secondary battery;
the third-voltage-side port is connected to the second feeding path for the accessory system, and
the power supplying system performs, at different timings, an operation of boosting the first voltage of the fuel cell equal to one times or greater to convert the first voltage into a voltage equal to the third voltage, and an operation of bucking the second voltage of the secondary battery equal to one times or smaller to convert the second voltage into a voltage equal to the third voltage.

14. The power supplying system according to claim 13, wherein a maximum value of the first voltage by the fuel cell is smaller than a minimum value of the second voltage by the secondary battery.

15. The power supplying system according to claim 13, wherein a minimum value of the second voltage by the secondary battery is larger than a maximum value of the first voltage by the fuel cell and the third voltage for operating the accessory system.

16. The power supplying system according to claim 13, wherein the third voltage for operating the accessory system is equal to a maximum value of the first voltage by the fuel cell or higher, and is equal to a minimum value of the second voltage by the secondary battery or lower.

17. The power supplying system according to claim 16, wherein the accessory system further includes:
a vehicular accessory including a lighting system of a vehicle; and
a bucking device which is connected between the second feeding path to the accessory system and the vehicular accessory, and which bucks the third voltage to convert the third voltage into a fifth voltage that is a maximum voltage for the vehicular accessory.

18. The power supplying system according to claim 16, wherein the accessory system further includes a vehicle-compartment air conditioner operated by the third voltage.

19. The power supplying system according to claim 13, wherein at a time of activation of the fuel cell, the second voltage by the secondary battery is bucked to supply power to the fuel-cell accessory by causing the backflow prevention switching device of the second power converter to turn on.

20. The power supplying system according to claim 13, further comprising:
a power-generating-level detecting unit which detects a power-generating level by the fuel cell,
wherein when it is detected that the fuel cell starts power generation and power sufficient to operate the fuel-cell accessory is generated, the backflow prevention switching device of the second power converter which is bucking the second voltage of the secondary battery and which is supplying power to the fuel-cell accessory is turned off.

21. The power supplying system according to claim 13, further comprising:
a power-generating-level detecting unit which detects a power-generating level by the fuel cell; and
a electricity storage level detecting unit which detects a electricity storage level by the secondary battery,
wherein when the power-generating-level detecting unit detects that the fuel cell is generating power sufficient to operate the load, and when the electricity storage level detecting unit detects that the electricity storage level by the secondary battery is higher than a predetermined level, and when electric power regeneration is caused by the load, the backflow prevention switching device of the second power converter is turned on to buck a voltage of regenerative power to the third voltage for operating the accessory system, and the bucked regenerative power is supplied to the accessory system through the second feeding path.

* * * * *